(12) United States Patent
Choi et al.

(10) Patent No.: US 11,056,904 B2
(45) Date of Patent: Jul. 6, 2021

(54) ELECTRONIC DEVICE FOR CHARGING BATTERY AND OPERATING METHOD THEREOF

(71) Applicant: SAMSUNG ELECTRONICS CO., LTD., Suwon-si (KR)

(72) Inventors: Hoon Choi, Hwaseong-si (KR);
Yong-Youn Kim, Anyang-si (KR);
Dong-Jun Lee, Suwon-si (KR);
Hyang-Bok Lee, Seoul (KR);
Seong-Kyu Maeng, Seoul (KR);
Ki-Yong Shin, Suwon-si (KR);
Han-Jun Yi, Seongnam-si (KR);
Jong-Wook Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 358 days.

(21) Appl. No.: 15/680,409

(22) Filed: Aug. 18, 2017

(65) Prior Publication Data
US 2018/0102667 A1    Apr. 12, 2018

(30) Foreign Application Priority Data

Oct. 10, 2016    (KR) .................. 10-2016-0130915

(51) Int. Cl.
*H02J 7/00*    (2006.01)
*H02J 7/02*    (2016.01)
(Continued)

(52) U.S. Cl.
CPC .............. *H02J 7/025* (2013.01); *H02J 7/007* (2013.01); *H02J 50/80* (2016.02); *H04B 5/0031* (2013.01);
(Continued)

(58) Field of Classification Search
CPC . Y02E 60/12; H02J 7/025; H02J 5/005; H02J 17/00; H02J 50/10; H02J 50/12;
(Continued)

(56) References Cited

U.S. PATENT DOCUMENTS

2006/0246841 A1*  11/2006  Dennis .................. H04W 52/10
                                                                   455/63.1
2007/0145945 A1   6/2007  McGinley et al.
(Continued)

FOREIGN PATENT DOCUMENTS

EP    2 930 586    10/2015
EP    3 021 452    5/2016
(Continued)

OTHER PUBLICATIONS

RSRP and RSRQ Measurement in LTE, Tech, printed Jul. 1, 2016, 6 pages.
(Continued)

*Primary Examiner* — Nathaniel R Pelton
*Assistant Examiner* — Mohammed J Sharief
(74) *Attorney, Agent, or Firm* — Nixon & Vanderhye P.C.

(57) ABSTRACT

An electronic device is provided, the electronic device including a communication circuit, a battery, and a processor, and the processor is configured to: obtain a strength of a communication signal received by the communication circuit; determine a magnitude of power for charging the battery based on the strength of the communication signal; and charge the battery with power of the determined magnitude.

20 Claims, 19 Drawing Sheets

(51) Int. Cl.
*H02J 50/80* (2016.01)
*H04B 5/00* (2006.01)
*G06F 3/041* (2006.01)

(52) U.S. Cl.
CPC .......... *H04B 5/0037* (2013.01); *G06F 3/041* (2013.01); *H02J 7/00034* (2020.01)

(58) Field of Classification Search
CPC .......... H02J 50/80; H02J 50/90; H02J 7/0044; H01F 38/14; Y02T 90/122; B60L 11/182; G06K 19/0723; G06K 7/0008; H04B 5/02; H04B 5/0012; H04B 5/00; H04B 1/3883; H04M 19/08; H04M 1/04
USPC ......... 320/108; 307/104; 455/41.1, 572, 573
See application file for complete search history.

(56) References Cited

U.S. PATENT DOCUMENTS

| | | | | |
|---|---|---|---|---|
| 2010/0048255 | A1* | 2/2010 | Jojivet | G06K 7/0008 455/573 |
| 2011/0062914 | A1* | 3/2011 | Park | H02J 7/0042 320/106 |
| 2011/0140661 | A1 | 6/2011 | Lee | |
| 2014/0285143 | A1* | 9/2014 | Kwon | H02J 50/20 320/108 |
| 2015/0126253 | A1* | 5/2015 | Tyler | H04B 17/318 455/566 |
| 2015/0296322 | A1 | 10/2015 | Won et al. | |
| 2015/0372529 | A1* | 12/2015 | Lampinen | H02J 5/005 455/572 |
| 2016/0064959 | A1* | 3/2016 | Jung | G06F 1/263 320/162 |
| 2016/0097522 | A1* | 4/2016 | Chien | F21V 23/02 362/183 |
| 2016/0141893 | A1 | 5/2016 | Lee et al. | |
| 2016/0181818 | A1* | 6/2016 | Joye | H01F 38/14 307/104 |
| 2016/0261151 | A1 | 9/2016 | Kim et al. | |
| 2017/0040813 | A1* | 2/2017 | Hu | H02J 7/02 |
| 2017/0093197 | A1* | 3/2017 | Gao | H02J 7/007 |

FOREIGN PATENT DOCUMENTS

| | | |
|---|---|---|
| JP | 2013-162672 | 8/2013 |
| KR | 10-2015-0031852 | 3/2015 |
| KR | 10-1620873 | 5/2016 |

OTHER PUBLICATIONS

Extended Search Report dated Nov. 13, 2017 in counterpart European Patent Application No. 17192773.4.

* cited by examiner

ELECTRONIC DEVICE FOR CHARGING BATTERY AND OPERATING METHOD THEREOF

CROSS-REFERENCE TO RELATED APPLICATION

This application is based on and claims priority under 35 U.S.C. § 119 to Korean Application Serial No. 10-2016-0130915, which was filed in the Korean Intellectual Property Office on Oct. 10, 2016, the content of which is incorporated by reference herein in its entirety.

TECHNICAL FIELD

The present disclosure relates generally to an electronic device for charging a battery, and an operation method thereof.

BACKGROUND

Recently, a smart phone, a wearable electronic device, and the like have been actively introduced, and are manufactured in small sizes such that users can carry them. Electronic devices provide a function which enables communication with other electronic devices. Electronic devices may drive various applications using a communication function, and may also provide various functions through various pieces of hardware. Accordingly, a relatively large amount of power may be consumed by electronic devices. As described above, an electronic device is manufactured in a small size and thus, a battery that is mounted on or embedded in the electronic device may also be manufactured in a relatively small size. Therefore, a relatively large amount of power, in comparison with the capacity of a battery, is consumed by an electronic device, and therefore charging must be frequently performed.

A conventional electronic device provides a quick charging function. In a quick charging mode, the conventional electronic device charges a battery with power of a larger magnitude than in a normal charging mode. When the electronic device charges the battery with power of a relatively large magnitude, Radio Frequency (RF) noise may be generated. In this instance, a communication signal that the electronic device transmits or receives may be affected by the RF noise, call-drop may occur, or it may become impossible to provide a communication service.

SUMMARY

The present disclosure is provided to address the above described drawbacks or other drawbacks, and various example embodiments may provide an electronic device that is capable of adjusting the magnitude of charging power based on the strength of a communication signal, and an operation method thereof.

According to various example embodiments of the present disclosure, an electronic device may include a communication circuit, a battery, and a processor, and the processor may be configured to perform control to: obtain the strength of a communication signal received by the communication circuit; determine a magnitude of power for charging the battery based on the strength of the communication signal; and charge the battery with power of the determined magnitude.

According to various example embodiments of the present disclosure, an operation method for charging a battery by an electronic device may include: obtaining the strength of a communication signal received by the electronic device; determining a magnitude of power to be used for charging the battery based on the strength of the communication signal; and charging the battery with power of the determined magnitude.

According to various example embodiments of the present disclosure, an electronic device that is capable of adjusting the magnitude of charging power based on the strength of a communication signal, and an operation method thereof are provided. Accordingly, the electronic device can favorably provide a communication function while performing charging with power of a relatively large magnitude.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein.

DETAILED DESCRIPTION

Figure 1:
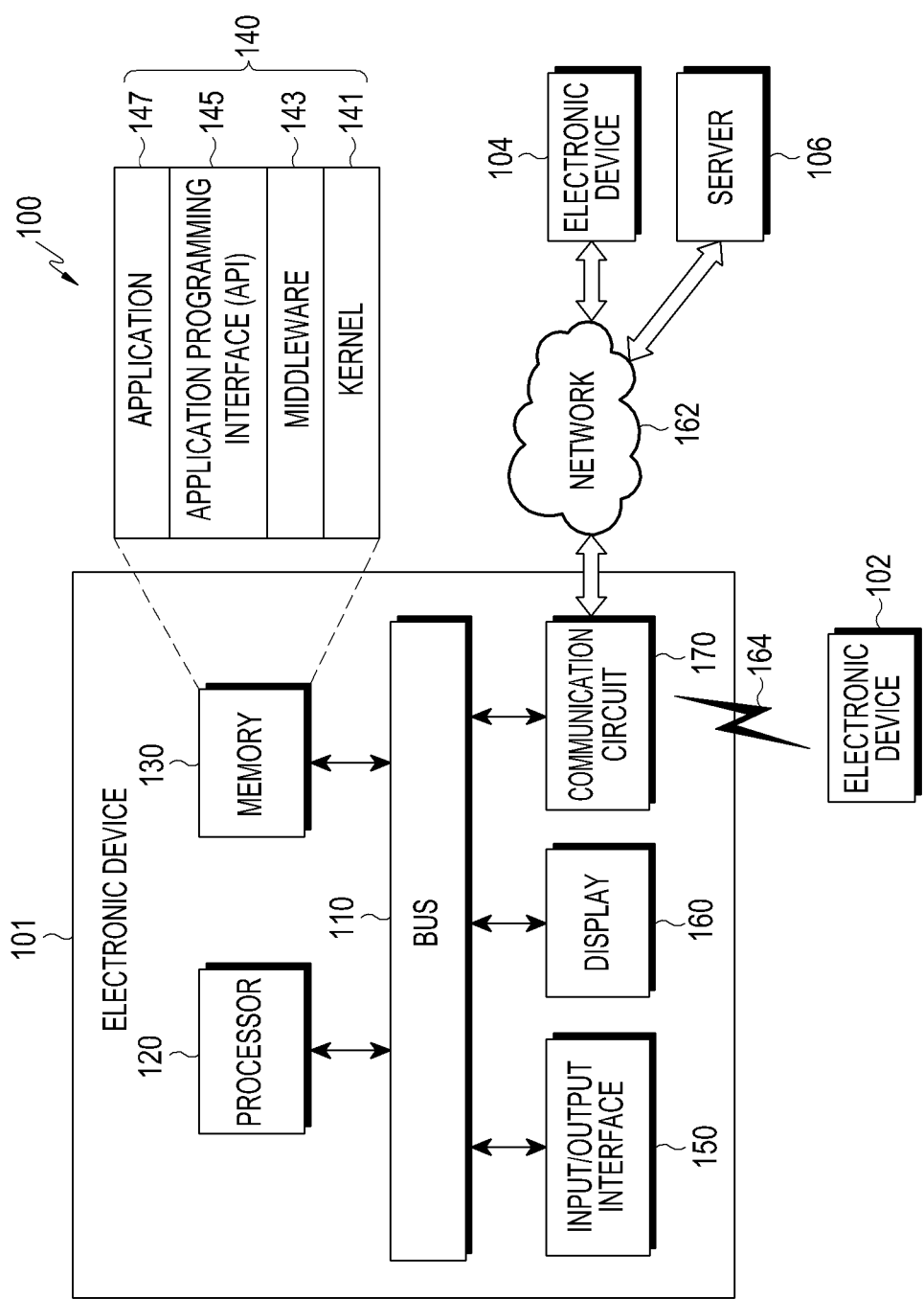
FIG. 1 is a block diagram illustrating an example electronic device in a network environment according to various example embodiments of the present disclosure.

Hereinafter, various example embodiments of the present disclosure will be described with reference to the accompanying drawings. The example embodiments and the terms used therein are not intended to limit the technology disclosed herein to specific forms, and should be understood to include various modifications, equivalents, and/or alternatives to the corresponding embodiments. In the description of the drawings, similar reference numerals may be used to designate similar elements. A singular expression may include a plural expression unless they are definitely different in a context. As used herein, singular forms may include plural forms as well unless the context clearly indicates otherwise. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may refer to a situation in which the device, together with other devices or components, "is able to". For example, the phrase "processor adapted (or configured) to perform A, B, and C" may refer, for example, and without limitation, to a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto. In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto. According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like), or the like, but is not limited thereto. In various embodiments, the electronic device may be flexible, or may be a combination of one or more of the aforementioned various devices. The electronic device according to one embodiment of the present disclosure is not limited to the above described devices. In the present disclosure, the term "user" may indicate a person using an electronic device or a device (e.g., an artificial intelligence electronic device) using an electronic device.

An electronic device 101 within a network environment 100 according to various example embodiments will be described with reference to FIG. 1 The electronic device 101 may include a bus 110, a processor (e.g., including processing circuitry) 120, a memory 130, an input/output interface (e.g., including input/output circuitry) 150, a display 160, and a communication circuit (e.g., including communication circuitry) 170. In some embodiments, the electronic device 101 may omit at least one of the elements, or may further include other elements.

The bus 110 may include, for example, a circuit that interconnects the elements 110 to 170 and delivers communication (e.g., control messages and/or data) between the elements.

The processor 120 may include various processing circuitry, such as, for example, and without limitation, one or more of a dedicated processor, a central processing unit, an application processor, and a communication processor (CP). The processor 120, for example, may carry out operations or data processing relating to the control and/or communication of at least one other element of the electronic device 101.

The memory 130 may include volatile and/or non-volatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an application programming interface (API) 145, and/or application programs (or "applications") 147. At least a part of the kernel 141, the middleware 143, or the API 145 may be referred to as an Operating System (OS). The kernel 141 may control or manage system resources (e.g., the bus 110, the processor 120, or the memory 130) used for executing an operation or function implemented by other programs (e.g., the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data. Furthermore, the middleware 143 may process one or more task requests, which are received from the application programs 147, according to the priorities thereof. For example, the middleware 143 may assign a priority to use the system resource (e.g., the bus 101, the processor 110, the memory 120, or the like) of the electronic device 101 to at least one of the application programs 147, and may process the one or more task requests. The API 145 is an interface used by the application 147 to control a function provided from the kernel 141 or the middleware 143, and may include, for example, at least one interface or function (e.g., an instruction) for file control, window control, image processing, character control, or the like.

The input/output interface 150 may include various input/output circuitry and forward an instruction or data, which is input from a user or an external device, to the other element(s) of the electronic device 101, or may output an instruction or data, which is received from the other element(s) of the electronic device 101, to the user or the external device.

The display 160 may include, for example, a Liquid Crystal Display (LCD), a Light-Emitting Diode (LED) display, an Organic Light-Emitting Diode (OLED) display, a Micro Electro Mechanical System (MEMS) display, or an electronic paper display, or the like, but is not limited thereto. The display 160 may display, for example, various types of content (e.g., text, images, videos, icons, and/or symbols) to a user. The display 160 may include a touch screen and may receive, for example, a touch, gesture, proximity, or hovering input using an electronic pen or a body part of the user.

The communication interface 170 may include various communication circuitry and configure communication, for example, between the electronic device 101 and an external device (e.g., a first external electronic device 102, a second external electronic device 104, or a server 106). For example, the communication interface 170 may be connected to a network 162 through wireless or wired communication to communicate with an external device (e.g., the second external electronic device 104 or the server 106). Additionally, the communication interface 170 may establish a short-range local-area communication connection 164 with and electronic device, such as, for example, and without limitation, a first external electronic device 102.

The wireless communication may include, for example, cellular communication that uses at least one of LTE, LTE-Advanced (LTE-A), Code Division Multiple Access (CDMA), Wideband CDMA (WCDMA), Universal Mobile Telecommunications System (UMTS), Wireless Broadband (WiBro), Global System for Mobile communications (GSM), and the like. According to an embodiment, the wireless communication may include, for example, at least one of Wi-Fi, Bluetooth, Bluetooth Low Energy (BLE), ZigBee, Near Field Communication (NFC), magnetic secure transmission, Radio Frequency (RF), and body area network (BAN). According to an embodiment, the wireless communication may include GNSS. The GNSS may be, for example, a Global Positioning System (GPS), a Global Navigation Satellite System (Glonass), a Beidou navigation satellite system (hereinafter, referred to as "Beidou"), or Galileo (the European global satellite-based navigation system). Hereinafter, in this document, the term "GPS" may be interchangeable with the term "GNSS". The wired communication may include, for example, at least one of a Universal Serial Bus (USB), a High Definition Multimedia Interface (HDMI), Recommended Standard 232 (RS-232), power line communication, a Plain Old Telephone Service (POTS), and the like. The network 162 may include a telecommunications network, for example, at least one of a computer network (e.g., a LAN or a WAN), the Internet, and a telephone network.

Each of the first and second external electronic devices 102 and 104 may be of a type the same as or different from the electronic device 101. According to various embodiments, all or some of the operations executed in the electronic device 101 may be executed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (e.g., the electronic device 102 or 104 or the server 106), instead of, or in addition to, performing the functions or services by itself. Another electronic device (e.g., the electronic device 102 or 104 or the server 106) may execute the requested functions or additional functions, and may deliver the result of execution to the electronic device 101. The electronic device 101 may provide the received result as it is, or may additionally process the received result to provide the requested functions or services. To this end, for example, cloud computing, distributed computing, or client-server computing technology may be used.

According to various example embodiments of the present disclosure, the processor 120 may be configured to: obtain the strength of a communication signal received by the communication circuit; determine the magnitude of power for charging the battery based on the strength of the communication signal; and charge the battery with power of the determined magnitude.

According to various example embodiments of the present disclosure, the processor 120 may be configured to: determine the magnitude of power to be a first magnitude for normal charging when the strength of the communication signal is less than or equal to a first threshold value; and determining the magnitude of power to be a second magnitude for quick charging when the strength of the communication signal exceeds the first threshold value.

According to various example embodiments of the present disclosure, the processor 120 may be configured to: determine that the strength of the communication signal is increased beyond a second threshold value in the middle of charging with power of the first magnitude since it was determined that the strength of the communication signal was less than or equal to the first threshold value; and change the magnitude of power from the first magnitude to the second magnitude.

According to various example embodiments of the present disclosure, the processor 120 may be configured to: compare the strength of the communication signal with the first threshold value; gradually decrease the magnitude of power until the strength of the communication signal exceeds the first threshold value when the strength of the communication signal is less than or equal to the first threshold value; and maintain charging with power of the decreased magnitude.

According to various example embodiments of the present disclosure, the processor 120 may be configured to: determine that the magnitude of the communication signal is increased beyond a second threshold value while charging is maintained with power of the decreased magnitude; and increase the magnitude of power to a predetermined magnitude.

According to various example embodiments of the present disclosure, the processor 120 may be configured to: read association information between a plurality of strengths of communication signals received by the electronic device and information associated with a plurality of magnitudes of power for charging, which respectively correspond to each of the plurality of strengths; and determine the magnitude of power by comparing the strength of the communication signal with the association information.

According to various example embodiments of the present disclosure, the electronic device 101 may further include a charger (not illustrated) for processing power and charging the battery.

According to various example embodiments of the present disclosure, the processor 120 may be configured to control an input current of the charger (not illustrated) based on the magnitude of power, and the charger (not illustrated) may receive power from the outside through a USB-micro B type or USB-C type power line from an adapter.

According to various example embodiments of the present disclosure, the processor 120 may be configured to: determine an output voltage of the adapter based on the magnitude of power; and transmit, to the adapter, another communication signal that requests adjustment of the output voltage of the adapter through the USB-micro B type or USB-C type data line.

According to various example embodiments of the present disclosure, the electronic device 101 may further include a power reception circuit for receiving wireless power from a wireless power transmitter. According to various example embodiments of the present disclosure, the processor 120 may be configured to control a reception condition of the power reception circuit based on the magnitude of power.

According to various example embodiments of the present disclosure, the electronic device 101 may further include a power reception circuit for receiving wireless power from a wireless power transmitter. According to various example embodiments of the present disclosure, the processor 120 may be configured to transmit another communication signal that requests adjustment of the wireless power based on the magnitude of power to the wireless power transmitter.

According to various example embodiments of the present disclosure, the processor 120 may be configured to: determine an amount of remaining power of the battery; and determine the magnitude of power based on the strength of the communication signal and the amount of remaining power.

Figure 2:
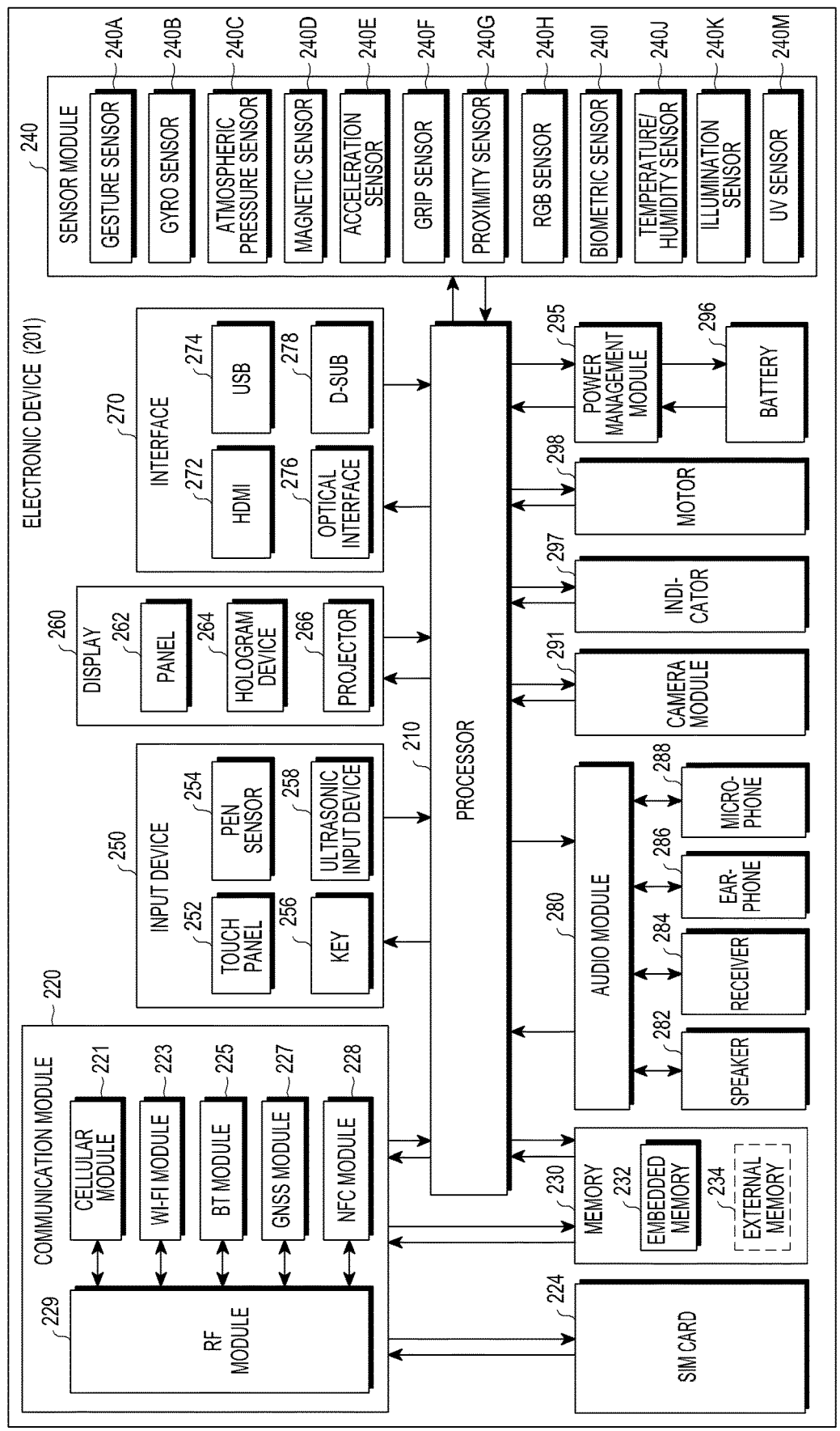
FIG. 2 is a block diagram illustrating an example electronic device according to various embodiments.

FIG. 2 is a block diagram illustrating an example electronic device 201 according to various example embodiments. The electronic device 201 may include, for example, the whole or a part of the electronic device 101 illustrated in FIG. 1. The electronic device 201 may include at least one processor (e.g., including processing circuitry) 210 (e.g., an AP), a communication module (e.g., including communication circuitry) 220, a subscriber identification module 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry and control a plurality of hardware or software elements connected thereto and may perform various data processing and operations by driving an operating system or an application program. The processor 210A may be embodied as, for example, a System on Chip (SoC). According to an embodiment, the processor 210 may further include a Graphic Processing Unit (GPU) and/or an image signal processor. The processor 210 may also include at least some (e.g., a cellular module 221) of the elements illustrated in FIG. 2. The processor 210 may load, in volatile memory, instructions or data received from at least one of the other elements (e.g., non-volatile memory), process the loaded instructions or data, and store the result data in the non-volatile memory.

The communication module 220 may have a configuration that is the same as, or similar to, that of the communication interface 170. The communication module 220 may include various communication circuitry, such as, for example, and without limitation, at least one of a cellular module 221, a Wi-Fi module 223, a Bluetooth module 225, a GNSS module 227, an NFC module 228, and an RF module 229. The cellular module 221 may provide, for example, a voice call, a video call, a text message service, an Internet service, or the like through a communication network. According to an embodiment, the cellular module 221 may identify and authenticate the electronic device 201 within a communication network using the subscriber identification module 224 (e.g., a SIM card). According to an embodiment, the cellular module 221 may perform at least some of the functions that the processor 210 may provide. According to an embodiment, the cellular module 221 may include a communication processor (CP). According to some embodiments, at least some (e.g., two or more) of the cellular module 221, the Wi-Fi module 223, the BT module 225, the GNSS module 227, and the NFC module 228 may be included in one Integrated Chip (IC) or IC package. The RF module 229 may transmit/receive, for example, a communication signal (e.g., an RF signal). The RF module 229 may include, for example, a transceiver, a Power Amp Module (PAM), a frequency filter, a Low Noise Amplifier (LNA), an antenna, or the like. According to another embodiment, at least one of the cellular module 221, the Wi-Fi module 223, the BT module 225, the GNSS module 227, and the NFC module 228 may transmit/receive an RF signal through a separate RF module. The subscriber identification module 224 may include, for example, a card that includes a subscriber identification module, or an embedded SIM, and may contain unique identification information (e.g., an Integrated Circuit Card Identifier (ICCID)) or subscriber information (e.g., International Mobile Subscriber Identity (IMSI)).

The memory 230 (e.g., the memory 130) may include, for example, an embedded memory 232 and/or an external memory 234. The embedded memory 232 may include, for example, at least one of a volatile memory (e.g., a DRAM, an SRAM, an SDRAM, or the like) and a non-volatile memory (e.g., a one-time programmable ROM (OTPROM), a PROM, an EPROM, an EEPROM, a mask ROM, a flash ROM, a flash memory, a hard disc drive, or a solid state drive (SSD)). The external memory 234 may include a flash drive, for example, a Compact Flash (CF), a Secure Digital (SD), a Micro-SD, a Mini-SD, an eXtreme digital (xD), a multi-media card (MMC), a memory stick, or the like. The external memory 234 may be functionally or physically connected to the electronic device 201 through various interfaces.

The sensor module 240 may, for example, measure a physical quantity or detect the operating state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a Red, Green, and Blue (RGB) sensor), a biometric sensor 240I, a temperature/humidity sensor 240J, an illumination sensor 240K, and a ultraviolet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments, the electronic device 201 may further include a processor configured to control the sensor module 240 as a part of or separately from the processor 210, and may control the sensor module 240 while the processor 210 is in a sleep state.

The input device 250 may include various input circuitry, such as, for example, and without limitation, at least one of a touch panel 252, a (digital) pen sensor 254, a key 256, or an ultrasonic input device 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user. The (digital) pen sensor 254 may include, for example, a recognition sheet, which is a part of, or separate from, the touch panel. The key 256 may include, for example, a physical button, an optical key, or a keypad. The ultrasonic input device 258 may detect ultrasonic waves, which are generated by an input tool, through a microphone (e.g., a microphone 288) to identify data corresponding to the detected ultrasonic waves.

The display 260 (e.g., the display 160) may include a panel 262, a hologram device 264, a projector 266, and/or a control circuit for controlling them. The panel 262 may be implemented to be, for example, flexible, transparent, or wearable. The panel 262, together with the touch panel 252, may be configured as one or more modules. According to an embodiment, the panel 262 may include a pressure sensor (or a force sensor) which may measure the strength of pressure of a user's touch. The pressure sensor may be embodied as an entity integrated with the touch panel 252, or may be embodied as one or more sensors separated from the touch panel 252. The hologram device 264 may show a three-dimensional image in the air using light interference. The projector 266 may display an image by projecting light onto a screen. The screen may be located, for example, in the interior of, or on the exterior of, the electronic device 201.

The interface 270 may include various interface circuitry, such as, for example, and without limitation, at least one of an HDMI 272, a USB 274, an optical interface 276, or a D-subminiature (D-sub) 278. The interface 270 may be included, for example, in the communication interface 170 illustrated in FIG. 1. Additionally or alternatively, the interface 270 may, for example, include a Mobile High-definition Link (MHL) interface, a Secure Digital (SD) card/Multi-Media Card (MMC) interface, or an infrared data association (IrDA) standard interface.

The audio module 280, for example, may convert a sound into an electrical signal, and vice versa. At least some elements of the audio module 280 may be included in, for example, the input/output interface 145 illustrated in FIG. 1. The audio module 280 may process sound information that is input or output through, for example, a speaker 282, a receiver 284, earphones 286, the microphone 288, or the like. The camera module 291 is a device that can photograph a still image and a moving image. According to an embodiment, the camera module 291 may include one or more image sensors (e.g., a front sensor or a rear sensor), a lens, an image signal processor (ISP), or a flash (e.g., an LED or xenon lamp). The power management module 295 may manage, for example, the power of the electronic device 201. According to an embodiment, the power management module 295 may include a Power Management Integrated Circuit (PMIC), a charger IC, or a battery or fuel gauge. The PMIC may use a wired and/or wireless charging method. The wireless charging method may include a magnetic resonance method, a magnetic induction method, an electromagnetic wave method, and the like. Additional circuits (e.g., a coil loop, a resonance circuit, a rectifier, and the like) for wireless charging may be further included. The battery gauge may measure, for example, the remaining charge of the battery 296 and a voltage, a current, or a temperature while charging. The battery 296 may include, for example, a rechargeable battery and/or a solar battery.

The indicator 297 may display a particular state, for example, a booting state, a message state, a charging state, or the like of the electronic device 201 or a part (e.g., the processor 210) of the electronic device 201. The motor 298 may convert an electric signal into a mechanical vibration, and may generate a vibration, a haptic effect, or the like. The electronic device 201 may include a mobile TV support device (e.g., GPU) that can process media data according to a standard such as digital multimedia broadcasting (DMB), digital video broadcasting (DVB), mediaFlo™, and the like. Each of the above-described elements of hardware according to the present disclosure may be configured with one or more components, and the names of the corresponding elements may vary based on the type of electronic device. In various embodiments, an electronic device (e.g., the electronic device 201) may omit some elements, or may further include additional elements, or some of the elements of the electronic device may be coupled to each other to configure one entity, in which case the entity may perform functions identical to those of the corresponding elements prior to the coupling.

Figure 3:
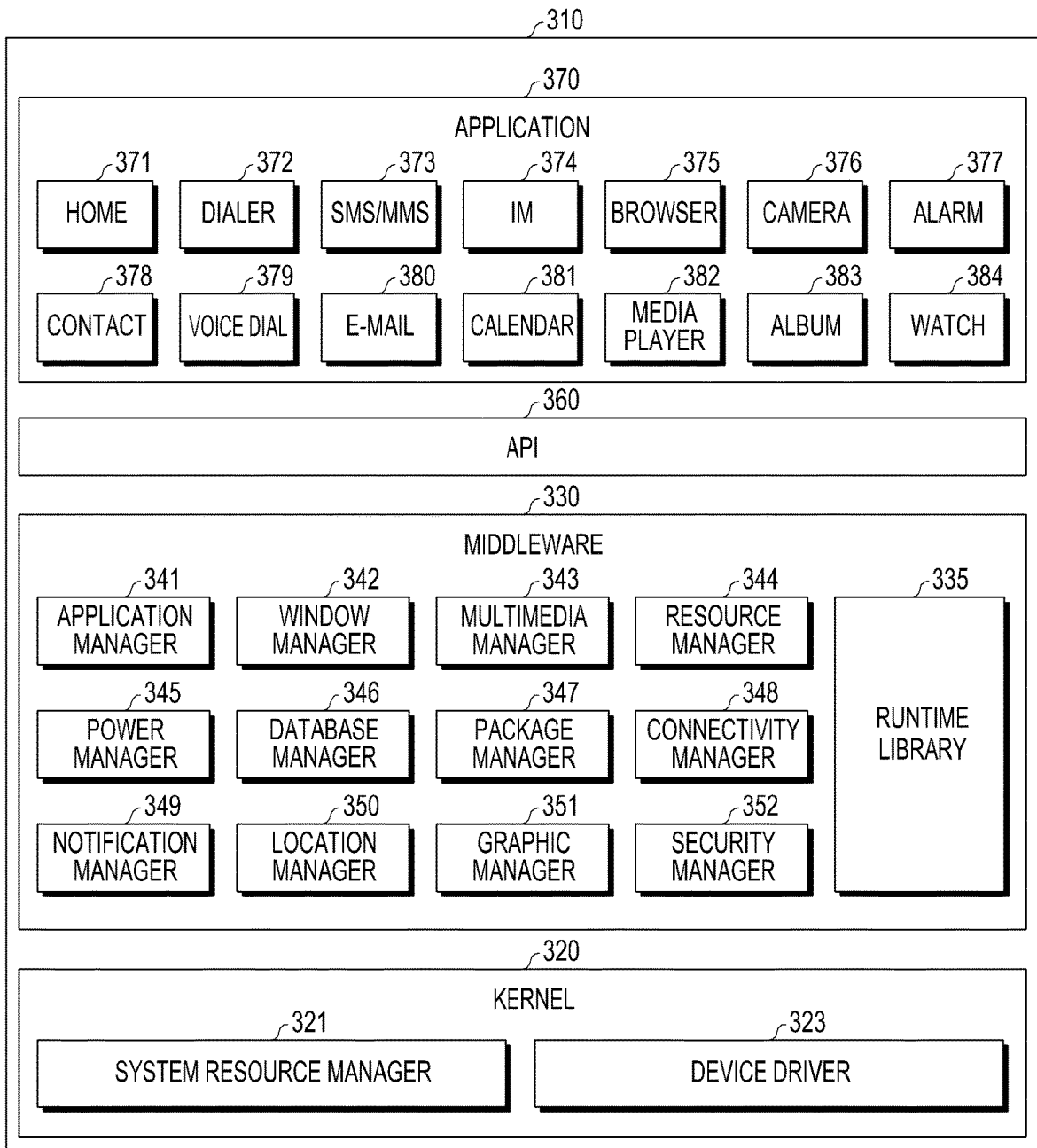
FIG. 3 is a block diagram illustrating an example program module according to various example embodiments.

FIG. 3 is a block diagram illustrating an example program module according to various example embodiments. According to an embodiment, the program module 310 (e.g., the program 140) may include an Operating System (OS) that controls resources relating to an electronic device (e.g., the electronic device 101) and/or various applications (e.g., the application programs 147) that are driven on the operating system. The operating system may include, for example, Android™, iOS™, Windows™, Symbian™, Tizen™, or Bada™.

Referring to FIG. 3, the program module 310 may include a kernel 320 (e.g., the kernel 141), middleware 330 (e.g., the middleware 143), an API 360 (e.g., the API 145), and/or applications 370 (e.g., the application programs 147). At least a part of the program module 310 may be preloaded on the electronic device, or may be downloaded from an external electronic device (e.g., the electronic device 102 or 104 or the server 106).

The kernel 320 may include, for example, a system resource manager 321 and/or a device driver 323. The system resource manager 321 may control, allocate, or retrieve system resources. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide, for example, a function required by the applications 370 in common, or may provide various functions to the applications 370 through the API 360 such that the applications 370 can efficiently use the limited system resources within the electronic device. According to an embodiment, the middleware 330 may include at least one of a runtime library 335, an application manager 341, a window manager 342, a multi-media manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 may manage input/output, manage memory, or process arithmetic functions. The application manager 341 may manage, for example, the life cycles of the applications 370. The window manager 342 may manage GUI resources used for a screen. The multimedia manager 343 may recognize formats required for reproducing various media files, and may encode or decode a media file using a codec suitable for a corresponding format. The resource manager 344 may manage the source code of the applications 370 or space in memory. The power manager 345 may manage, for example, the capacity or power of a battery, and may provide power information required for operating an electronic device. According to an embodiment, the power manager 345 may operate in conjunction with a basic input/output system (BIOS). The database manager 346 may, for example, generate, search, or change databases to be used by the applications 370. The package manager 347 may manage the installation or update of an application that is distributed in the form of a package file.

The connectivity manager 348 may manage, for example, a wireless connection. The notification manager 349 may provide an event (e.g., an arrival message, an appointment, a proximity notification, and the like) to a user. The location manager 350 may manage, for example, the location information of the electronic device. The graphic manager 351 may manage a graphic effect, which is to be provided to a user, or a user interface related to the graphic effect. The security manager 352 may provide, for example, system security or user authentication. According to an embodiment, the middleware 330 may include a telephony manager for managing a voice or video call function of the electronic device or a middleware module that is capable of making a combination of the functions of the above-described elements. According to an embodiment, the middleware 330 may provide specialized modules based on the type of operating system. Also, the middleware 330 may dynamically delete some existing elements, or may add new elements. The API 360 is, for example, a set of API programming functions, and may be provided as different configurations depending on the operating system. For example, in the case of Android or iOS, one API set may be provided for each platform, and in the case of Tizen, two or more API sets may be provided for each platform.

The applications 370 may include applications that provide, for example, home 371, a dialer 372, SMS/MMS 373, instant messaging (IM) 374, a browser 375, a camera 376, an alarm 377, contacts 378, a voice dialer 379, e-mail 380, a calendar 381, a media player 382, an album 383, watch 384. Additionally, or alternatively, though not shown, the applications 370 may include various other application, such as, for example, and without limitation, health care functions (e.g., measuring exercise quantity or blood glucose), environmental information (e.g., atmospheric pressure, humidity, or temperature information), and the like. According to an embodiment, the applications 370 may include an information exchange application that can support the exchange of information between the electronic device and an external electronic device. The information exchange application may include, for example, a notification relay application for relaying predetermined information to an external electronic device, or a device management application for managing an external electronic device. For example, the notification relay application may relay notification information generated in the other applications of the electronic device to an external electronic device, or may receive notification information from an external electronic device and provide the received notification information to a user. The device management application may install, delete, or update functions of an external electronic device that communicates with the electronic device (e.g., turning on/off the external electronic device itself (or some elements thereof) or adjusting the brightness (or resolution) of a display) or applications executed in the external electronic device. According to an embodiment, the applications 370 may include applications (e.g., a health care application of a mobile medical appliance) that are designated according to the attributes of the external electronic device. According to an embodiment, the applications 370 may include applications received from an external electronic device. At least some of the program module 310 may be implemented (e.g., executed) by software, firmware, hardware (e.g., the processor 210), or a combination of two or more thereof, and may include a module, a program, a routine, an instruction set, or a process for performing one or more functions.

The term "module" as used herein may include a unit including hardware, software, or firmware, or any combinations thereof, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, and without limitation, a dedicate processor, a CPU, an Application-Specific Integrated Circuit (ASIC) chip, a Field-Programmable Gate Arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code which is made by a compiler or a code which may be executed by an interpreter. The programming module according to the present disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

Figure 4:
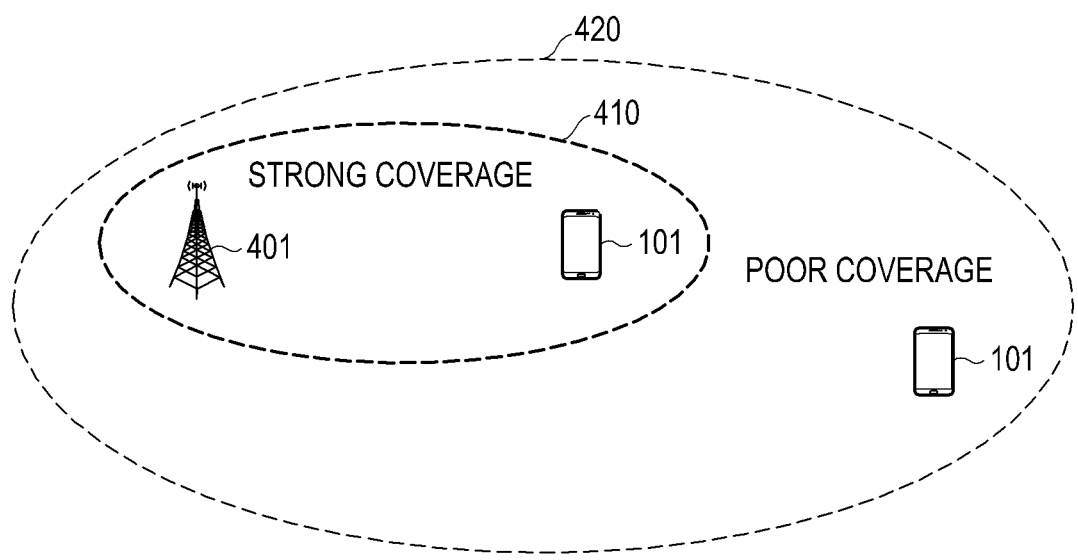
FIG. 4 is a diagram illustrating an example electronic device and an example access point (AP) according to various example embodiments of the present disclosure.

FIG. 4 is a diagram illustrating an example electronic device and an example Access Point (AP) according to various example embodiments of the present disclosure.

An AP 401 may communicate with the electronic device 101. The electronic device 101 may perform, for example, wired charging. The electronic device 101 receives power from an adapter and charges a battery. The adapter may be manufactured as an adapter for quick charging. For example, an adapter for normal charging provides power of 10 W with a voltage of 5V and a current of 2 A. An adapter for quick charging may provide power of 15 W with a voltage of 9V and a current of 1.67 A. The magnitude of voltage and current of power provided by the adapter for normal charging and the magnitude of voltage and current of power provided by the adapter for quick charging are specified merely for illustrative purposes. When the electronic device 101 is connected with an adapter for quick charging, the electronic device 101 recognizes the adapter, and upon recognition, receives power for quick charging. When the electronic device 101 is disposed in a strong coverage area 410, the electronic device 101 may perform control to receive power for quick charging. On the other hand, when the electronic device 101 is disposed in a poor coverage area 420, the electronic device 101 may perform control to receive power lower than power for quick charging. That is, even though the electronic device 101 is connected with the adapter for quick charging, the electronic device 101 receives power lower than the amount of power that can be provided by the adapter, whereby the favorable provision of a communication function is secured. Additionally, when the electronic device 101 is disposed in the poor coverage area 420 and receives power for quick charging, a communication function may be degraded due to RF noise attributable to power. Accordingly, the electronic device 101 according to various embodiments of the present disclosure may adjust the magnitude of power for charging and may perform charging when the electronic device 101 is disposed in the poor coverage area 420. For example, the electronic device 101 switches from a quick charging mode to a normal charging mode, whereby charging is performed with power for normal charging. Alternatively, the electronic device 101 determines the magnitude of power corresponding to the strength of a communication signal, and may perform charging with power of the determined magnitude. As described above, the electronic device 101 may perform charging with power of a relatively large magnitude, and may provide a reliable communication function.

Figure 5:
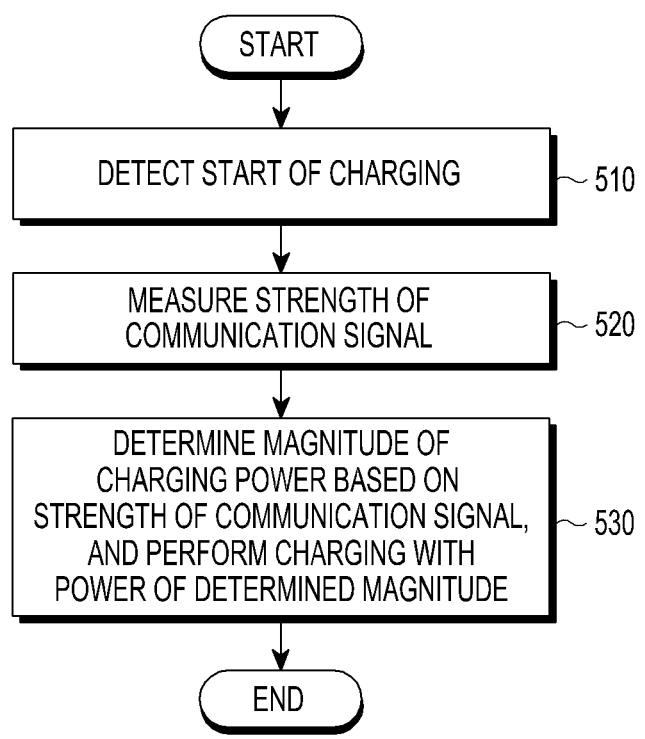
FIG. 5 is a flowchart illustrating an example operation method of an electronic device according to various example embodiments of the present disclosure.

FIG. 5 is a flowchart illustrating an example operation method of an electronic device according to various example embodiments of the present disclosure. Hereinafter, the fact that the electronic device 101 executes a predetermined operation may indicate that the processor 120 of the electronic device 101 performs a predetermined operation or that the processor 120 performs control to enable another piece of hardware to perform a predetermined operation.

In operation 510, the electronic device 101 may detect the start of charging. For example, the electronic device may detect the start of charging by detecting that the electronic device 101 is connected by wire with an adapter. Alternatively, the electronic device 101 detects the start of charging by detecting a charging start event defined in accordance with various wireless power standards. For example, the electronic device 101 may detect the start of charging based on the reception of a communication signal indicating the start of charging (charge start) defined in an A4WP standard.

When the start of charging is detected, the electronic device 101 may measure the strength of a communication signal in operation 520. For example, the electronic device 101 may perform communication based on various schemes, and may measure the strength of a communication signal received from another electronic device, such as an AP or the like. The electronic device 101 is capable of measuring the RSSI or RSRP of a received communication signal, and those skilled in the art may readily understand that any information can be used if the information can indicate the strength of a communication signal. For example, a CP of the electronic device 101 may determine an RSRP in real time, and may transmit the same to the AP. The AP may measure the strength of a received communication signal by receiving the RSRP. As described above, the processor 120 may include at least one of a CP and an AP, whereby the processor 120 may be made aware of the strength of a communication signal.

In operation 530, the electronic device 101, for example, the processor 120, determines the magnitude of charging power based on the strength of a communication signal, and controls charging to be performed with power of the determined magnitude. According to various embodiments of the present disclosure, the electronic device 101 may support two types of charging modes, namely a normal charging mode and a quick charging mode. For example, according to an embodiment, the electronic device 101 provides a normal charging mode that provides power of 10 W with a voltage of 5V and a current of 2 A, and a quick charging mode that provides power of 15 W with a voltage of 9V and a current of 1.67 A. In this instance, when it is determined that the strength of a communication signal exceeds a predetermined threshold value, the electronic device 101 may perform charging based on one out of the normal charging mode and the quick charging mode. When it is determined that the strength of the communication signal is less than or equal to the predetermined threshold value, the electronic device 101 may perform charging based on the normal charging mode. Here, the threshold value is a numeric value indicating poor coverage, and may be a numeric value at which a reliable communication service is not secured or is degraded due to RF noise attributable to quick charging. The numeric value may be set based on, for example, experimentation.

According to another embodiment, the electronic device 101 may freely adjust the magnitude of charging power. That is, the electronic device 101 may determine charging power of various magnitudes, instead of two charging modes. For example, the electronic device 101 may determine an arbitrary numeric value, which is different from 10 W and 15 W, as the magnitude of power, and may perform control to receive power of the determined numeric value. As the magnitude of charging power increases, RF noise attributable to charging power may also increase. Accordingly, when the strength of a communication signal is relatively high, the electronic device 101 performs charging with power of a relatively large magnitude. Further, when the strength of a communication signal is relatively low, the electronic device 101 may need to set the magnitude of charging power to be relatively small. Accordingly, the electronic device 101 may determine the strength of power adaptively based on the strength of a communication signal.

According to various embodiments of the present disclosure, the electronic device 101 may control charging to be performed with charging power of a magnitude determined by adjusting an input current value of a charger. As the input current value of the charger changes, the magnitude of power input into the charger may also be adjusted. Alternatively, the electronic device 101 may control charging to be performed with charging power of a magnitude determined by adjusting the voltage of power received from an adapter. The electronic device 101 may output, to the adapter, a signal for adjusting the voltage of charging power, and the adapter may adjust the voltage of charging power and provide the same to the electronic device 101. As the magnitude of charging power changes, the magnitude of power input into the charger may also be adjusted.

Alternatively, the electronic device 101 may wirelessly receive power. In this instance, the electronic device 101 may adjust the numeric value of an input current of a charger, whereby the magnitude of power may be adjusted. Alternatively, the electronic device 101 may adjust the magnitude of power by detuning a resonant frequency. Alternatively, the electronic device 101 may transmit a communication signal that requests adjustment of the magnitude of power to a wireless power transmitter through in-band or out-band communication. The wireless power transmitter may adjust at least one out of the current and the voltage of power output to a resonator or a coil based on a received communication signal, whereby the magnitude of power received by the electronic device 101 may be adjusted.

As described above, the electronic device 101 may adjust the magnitude of charging power based on the strength of a communication signal, whereby the reliable provision of a communication service may be secured.

Figure 6A:
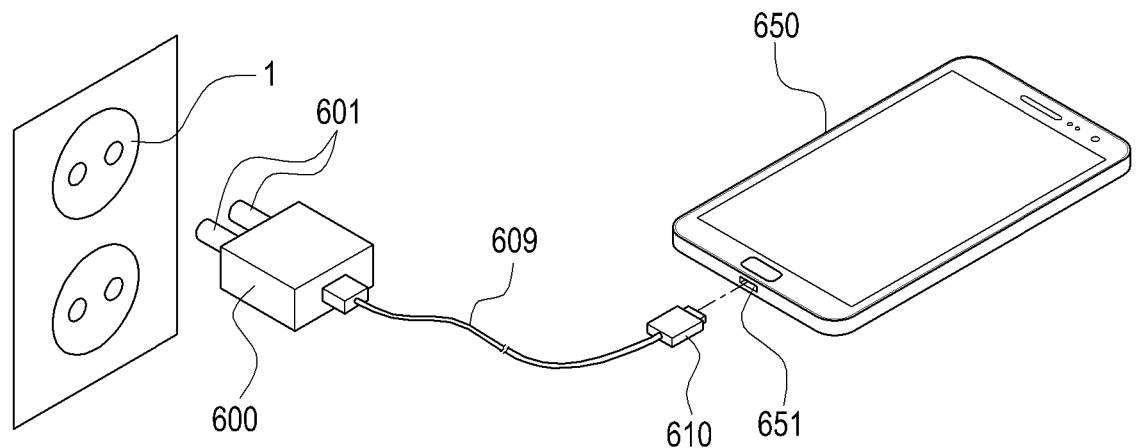
FIG. 6A is a diagram illustrating an example of wired charging of an electronic device according to various example embodiments of the present disclosure.

FIG. 6A is a diagram illustrating an example of wired charging of an electronic device according to various example embodiments of the present disclosure.

As illustrated in FIG. 6A, an adapter 600 may include a plug 601 which is connectable to an outlet 1. The plug 601 may be embodied in a form corresponding to a defined voltage, and may receive power from an external power source through the outlet 1. The adapter 600 may down-convert power received through the plug 601, and may transfer the same to an electronic device 650. The adapter 600 may drop the level of the voltage of received power to a predetermined level, and may also perform rectifying. For example, when power received from the outlet 1 is an alternating current with a voltage of 220V, the adapter 600 may output, for example, direct current power of 9V. The adapter 600 may be connectable to a cable 609 that includes a connector 610 for connection with the electronic device 650. The connector 610 according to various embodiments of the present disclosure may include a connection terminal defined in a universal serial bus (USB). The electronic device 650 may also include a port 651, which is connectable with the connector 610. According to various embodiments of the present disclosure, the connector 610 and the port 651 may be embodied based on a USB-micro B type, a USB-C type, or the like. It will be apparent to those skilled in the art that the type of USB is not limited.

According to various embodiments of the present disclosure, the adapter 600 may support a function of adjusting the magnitude of the voltage of power provided to the electronic device 650. Alternatively, the adapter 600 may provide power of a predetermined magnitude to the electronic device 650, without supporting the above described function. The electronic device 650 receives power from the adapter 600 and performs charging. The electronic device 650 may adjust the magnitude of received power based on the measured strength of a communication signal.

Figure 6B:
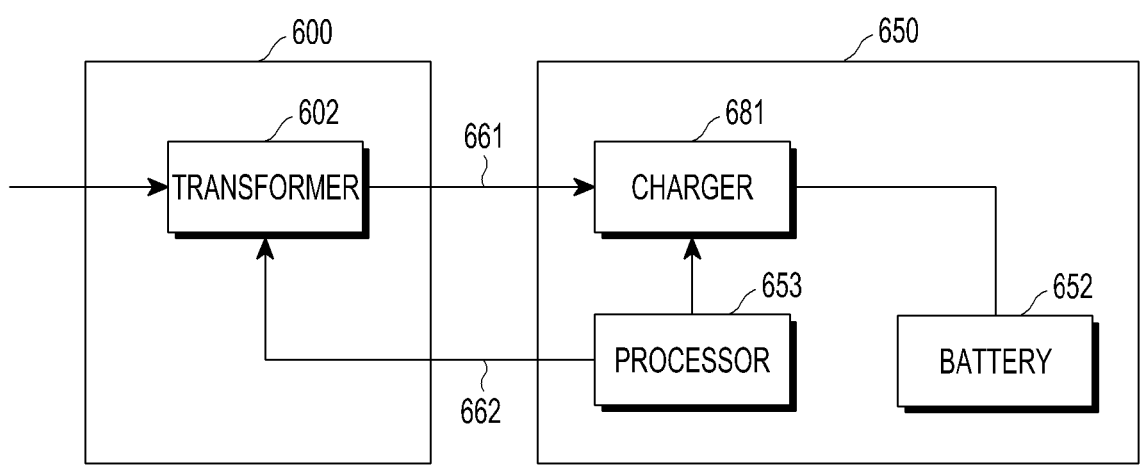
FIG. 6B is a block diagram illustrating an example charging circuit according to various example embodiments of the present disclosure.

FIG. 6B is a block diagram illustrating a charging configuration according to various example embodiments of the present disclosure.

The adapter 600 may include a transformer 602. The electronic device 650 may include a charger 681, a battery 652, and a processor 653. The transformer 602 may transform, for example, down-convert, power from an external power source. The transformer 602 may include a primary-side coil having a first coil-turn count and a secondary-side coil having a second coil-turn count. Based on the difference in the number of coil turns between the primary-side coil and the secondary-side coil, the transformer 602 outputs power by changing the level of power. Accordingly, as power with a first level of voltage is input, the transformer 602 performs transformation, whereby power with a second level of voltage may be output.

The charger 681 may receive power through a power line 661 from the transformer 602, may process the received power to be appropriate for charging the battery 652, and may charge the battery 652. The magnitude of power input into the charger 681 through the power line 661 may be too large to charge the battery 652, which is undesirable for charging the battery 652. In this instance, the charger 681 may reduce the magnitude of the input power and may output the same to the battery 652. Alternatively, the charger 681 may adjust a voltage applied to the battery 652 or a current input to the battery 652 based on one of a constant current (CC) mode, a constant voltage (CV) mode, Multi Step Constant Current (MSCC), and Multi Step Constant Voltage (MSCV).

According to various example embodiments of the present disclosure, the processor 653 may obtain the strength of a communication signal, and may adjust the magnitude of power input into the charger 681 based on the strength of the communication signal. The charger 681 may support a function of adjusting the magnitude of a received current. Accordingly, the processor 653 may adjust the magnitude of an input current of the charger 681, and may adjust the magnitude of an input current based on the strength of a communication signal. According to another embodiment, the processor 653 may transmit, to the adapter 600, a communication signal that adjusts the magnitude of the voltage of output power through, for example, a data line 662. The processor 653 may determine the magnitude of the voltage of received power based on the measured strength of a communication signal, and may transmit a communication signal for adjusting the magnitude of a voltage to the adapter 600 through the data line 662. The adapter 600 may adjust the magnitude of the voltage of power provided to the power line 661 based on the received communication signal, whereby the magnitude of power provided to the electronic device 650 may be adjusted.

According to an embodiment of the present disclosure, the electronic device 650 may support both types of charging modes, that is, a normal charging mode and a quick charging mode. Further, the adapter 600 may be configured to provide power with a current and a voltage corresponding to the quick charging mode. The electronic device 650 may detect the insertion of the connector 610 of the adapter 600, and the processor 653 may identify that the adapter 600 is an adapter for quick charging. The processor 653 may identify the type of the adapter based on at least one out of the magnitude of a current and the magnitude of a voltage, measured in the power line 661. Alternatively, the processor 653 may identify the type of the adapter based on adapter identification information received through the data line 662. According to another embodiment, the electronic device 650 may not identify the type of the adapter.

When the adapter is identified as an adapter for quick charging, the processor 653 may obtain the strength of a communication signal. When it is determined that the strength of the communication signal is less than or equal to a predetermined threshold value, the processor 653 may control charging to be performed based on the normal charging mode. That is, the processor 653 may control the charger 681 to receive power with a current having a magnitude corresponding to the normal charging mode. Further, the processor 653 may transmit a communication signal to the adapter 600 so that power with a voltage having a magnitude corresponding to the normal charging mode is received.

According to another embodiment, the electronic device 650, for example, the processor 653, may determine charging power in various magnitudes, instead of two charging modes. The processor 653 may determine the magnitude of charging power based on the measured strength of a communication signal. For example, the electronic device 650 may store link information between the strength of a communication signal and the magnitude of charging power, and the processor 653 may determine the magnitude of charging power based on association information. Based on the association information, the processor 653 may adjust the magnitude of an input current of the charger 681, or may transmit a communication signal for adjusting the magnitude of a voltage of received power to the adapter 600. For example, the processor 653 may calculate at least one out of an input current and the voltage of received power of the charger 681 based on the magnitude of power, determined with reference to the association information. Alternatively, the reference information may include association information between the strength of a communication signal and an input current of the charger 681. In this instance, the processor 653 may determine the magnitude of an input current of the charger 681, which corresponds to the strength of the communication signal, based on the reference information. Alternatively, the reference information may include association information between the strength of a communication signal and a voltage of power. In this instance, the processor 653 may transmit, to the adapter 600 through the data line 662, a communication signal for requesting a voltage corresponding to the strength of the communication signal based on the reference information.

As described above, the adapter 600 may not support a function of adjusting the magnitude of an output voltage. In this instance, the processor 653 may adjust the magnitude of charging power by adjusting the magnitude of the input current of the charger 681.

Figure 7:
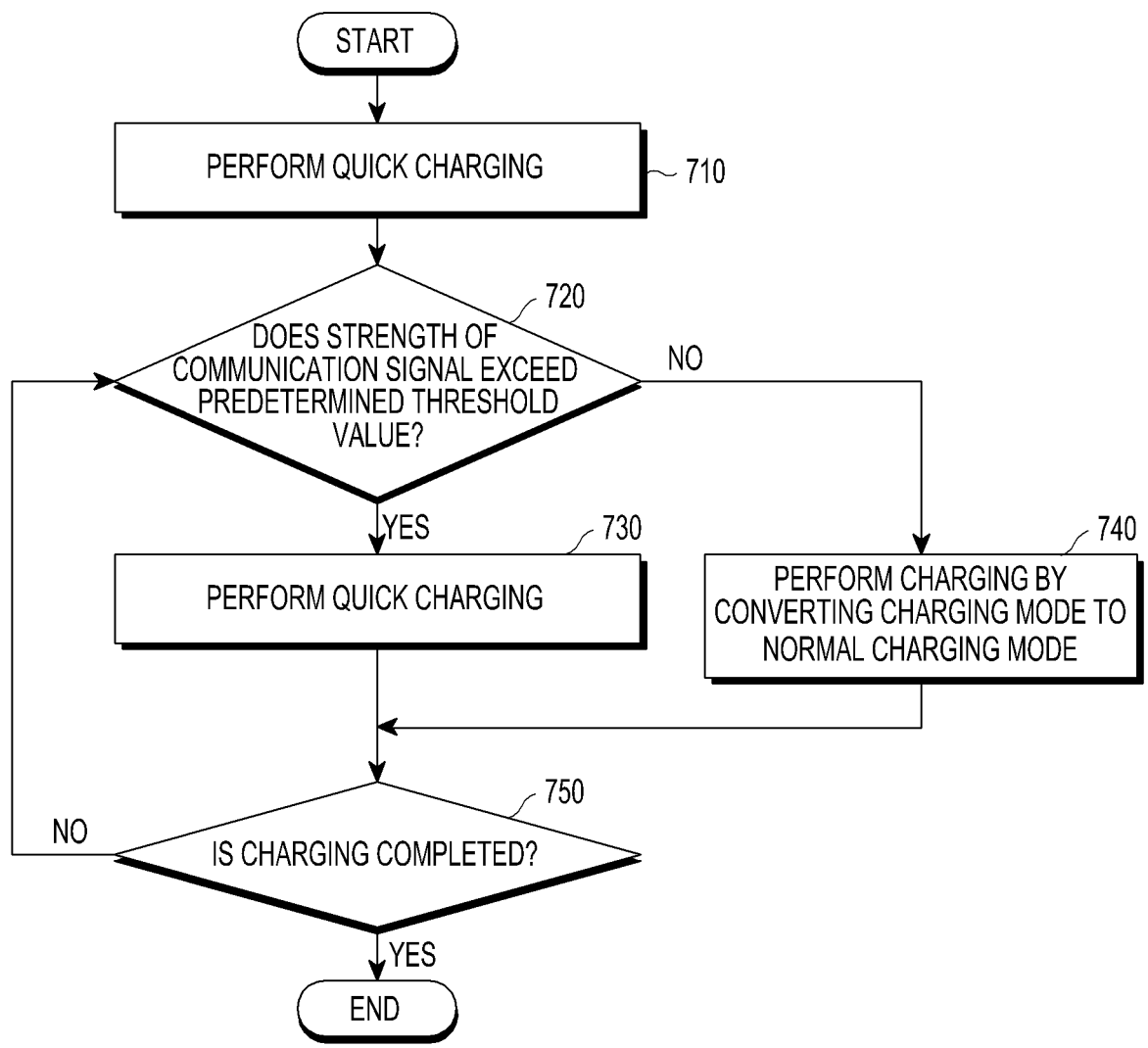
FIG. 7 is a flowchart illustrating an example operation method of an electronic device according to various example embodiments of the present disclosure.
Figure 8:
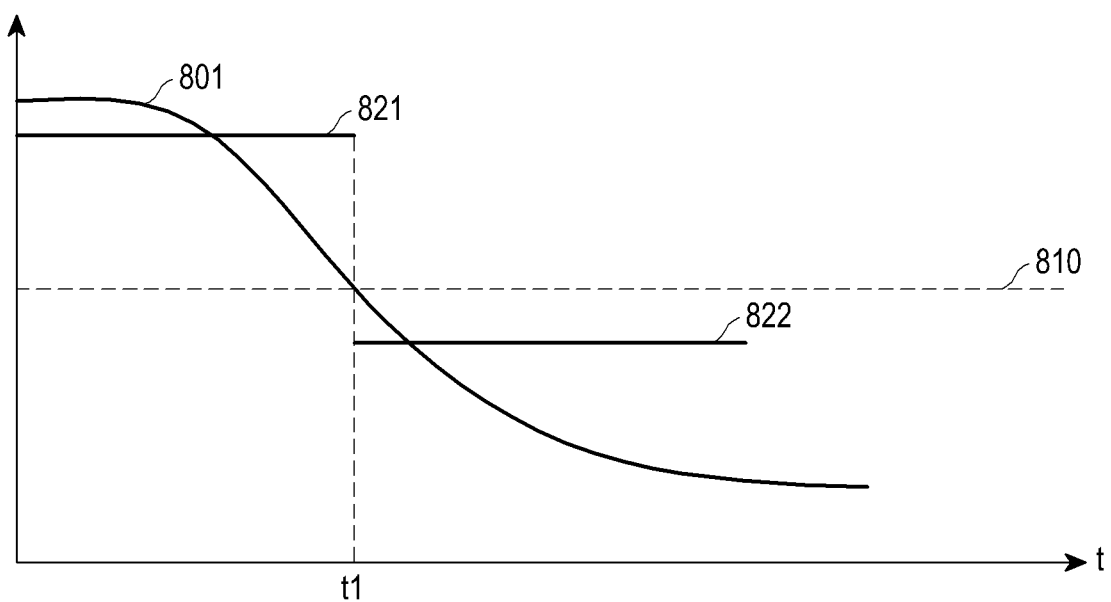
FIG. 8 is a graph illustrating the strength of a communication signal and the magnitude of charging power according to various example embodiments of the present disclosure.

FIG. 7 is a flowchart illustrating an example operation method of an electronic device according to various example embodiments of the present disclosure. The embodiment of FIG. 7 will be described in greater detail with reference to FIG. 8. FIG. 8 is a graph illustrating example strength of a communication signal and the magnitude of charging power according to various example embodiments of the present disclosure.

In operation 710, the electronic device 101 may perform quick charging. In the embodiment of FIG. 7, the electronic device 101 may support two types of charging modes. For example, as illustrated in FIG. 8, the electronic device 101 may charge a battery with power 821 of a first magnitude in the quick charging mode. Alternatively, the electronic device 101 may charge the battery with power 822 of a second magnitude in the normal charging mode.

In operation 720, the electronic device 101 may determine whether the strength of a communication signal exceeds a predetermined threshold value. As described above, the threshold value may be a numeric value set for providing a reliable communication service. That is, when the measured strength of the communication signal is less than or equal to the predetermined threshold value, this indicates that the provision of reliable communication service is not secured. For example, as illustrated in FIG. 8, when the electronic device 101 starts charging with the power 821 of the first magnitude in the quick charging mode, the strength 801 of the communication signal may be decreased to be less than or equal to the threshold value 810 by RF noise. When the strength of the communication signal is less than or equal to the predetermined threshold value, the electronic device 101 may convert the charging mode to the normal charging mode, and may perform charging in the normal charging mode in operation 740. As described above, when wired charging is performed, the electronic device 101 may perform at least one out of adjusting an input current of a charger and transmitting a communication signal for adjusting an output voltage of an adapter, whereby the charging mode is changed to the normal charging mode. Alternatively, in the case of wireless charging, the electronic device 101 may perform at least one out of adjusting an input current of a charger, detuning a resonant frequency, and transmitting a communication signal for adjusting output power of a wireless power transmitter, and may convert the charging mode to the normal charging mode.

Accordingly, as illustrated in FIG. 8, the electronic device 101 may charge the battery with the power 822 of the second magnitude. The electronic device 101 may detect a drop in the strength of a communication signal, which is less than or equal to the threshold value, at a first point in time (t1), and based thereon, may adjust the magnitude of power from the first magnitude to the second magnitude.

Meanwhile, the strength of a communication signal may be maintained greater than the threshold value even when quick charging is performed. In this instance, the electronic device 101 may maintain quick charging in operation 730. In operation 750, the electronic device 101 may determine whether to maintain quick charging by measuring the strength of a communication signal until charging is completed.

Figure 9:
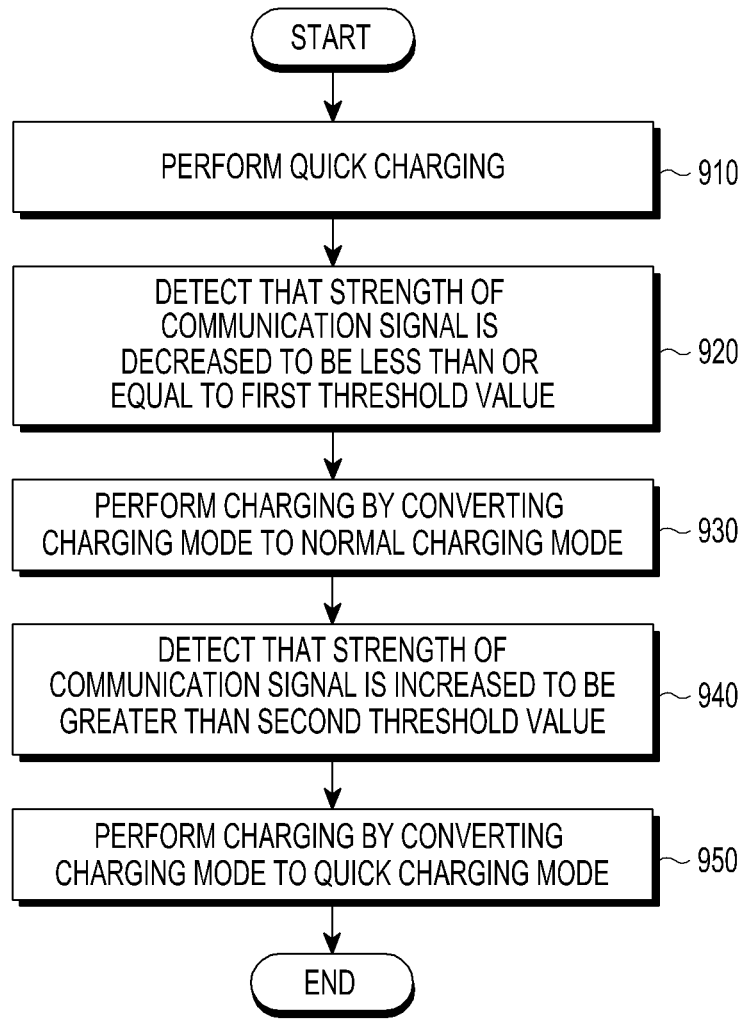
FIG. 9 is a flowchart illustrating an example operation method of an electronic device according to various example embodiments of the present disclosure.
Figure 10:
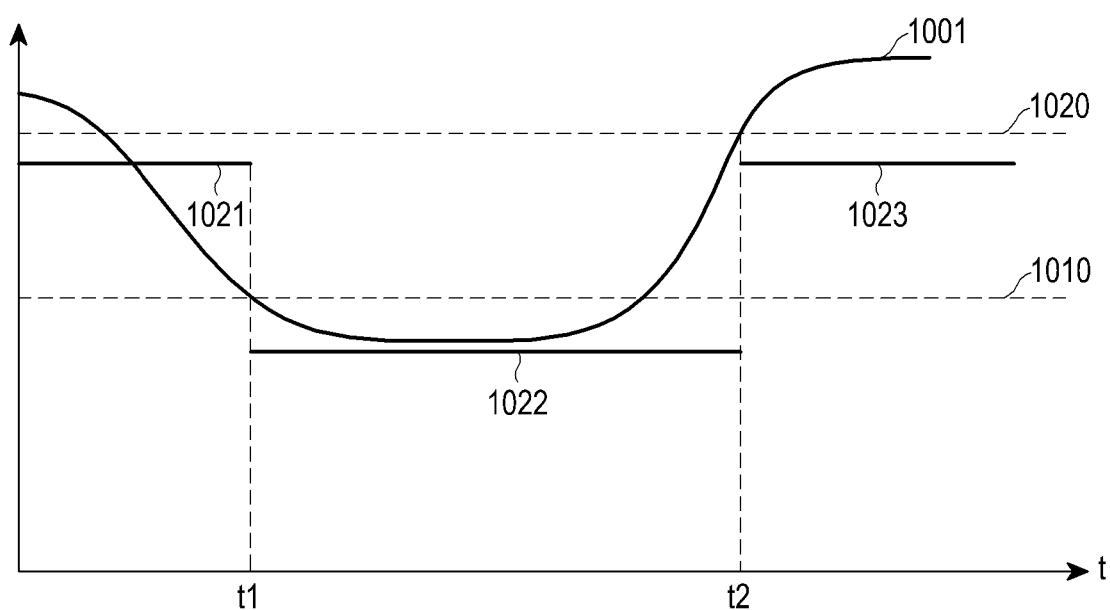
FIG. 10 is a graph illustrating the strength of a communication signal and the magnitude of charging power according to various example embodiments of the present disclosure.

FIG. 9 is a flowchart illustrating an example operation method of an electronic device according to various example embodiments of the present disclosure. The embodiment of FIG. 9 will be described in greater detail with reference to FIG. 10. FIG. 10 is a graph illustrating example strength of a communication signal and the magnitude of charging power according to various example embodiments of the present disclosure.

In operation 910, the electronic device 101 may perform quick charging. In the embodiment of FIG. 9, the electronic device 101 may support two types of charging modes. For example, as illustrated in FIG. 10, the electronic device 101 may charge a battery with power 1021 with a first magnitude in a quick charging mode. Alternatively, the electronic device 101 may charge the battery with power 1022 of a second magnitude in a normal charging mode.

In operation 920, as illustrated in FIG. 10, the electronic device 101 may detect that the strength of a communication signal 1001 is decreased to be less than or equal to a first threshold value 1010 at a first point in time (t1). In operation 930, the electronic device 101 may perform charging by converting a charging mode to the normal charging mode. Accordingly, the electronic device 101 may convert the charging mode to the normal charging mode so as to charge the battery with the power 1022 of the second magnitude.

In operation 940, the electronic device 101 may detect an increase in the strength of a communication signal is greater than a second threshold value 1020 at a second point in time (t2). For example, the electronic device 101 may enter a strong coverage area. The second threshold value 1020 may be a numeric value which is set to provide good communication service even in the quick charging mode. In operation 950, the electronic device 101 may convert the charging mode to the quick charging mode, and may perform charging. As illustrated in FIG. 10, the electronic device 101 may perform charging with power 1023 of a first magnitude. According to various embodiments of the present disclosure, the second threshold value 1020 may be set to be higher than the first threshold value 1010. Accordingly, the electronic device 101 may be prevented from being repeatedly switched between the normal charging mode and the quick charging mode.

Figure 11:
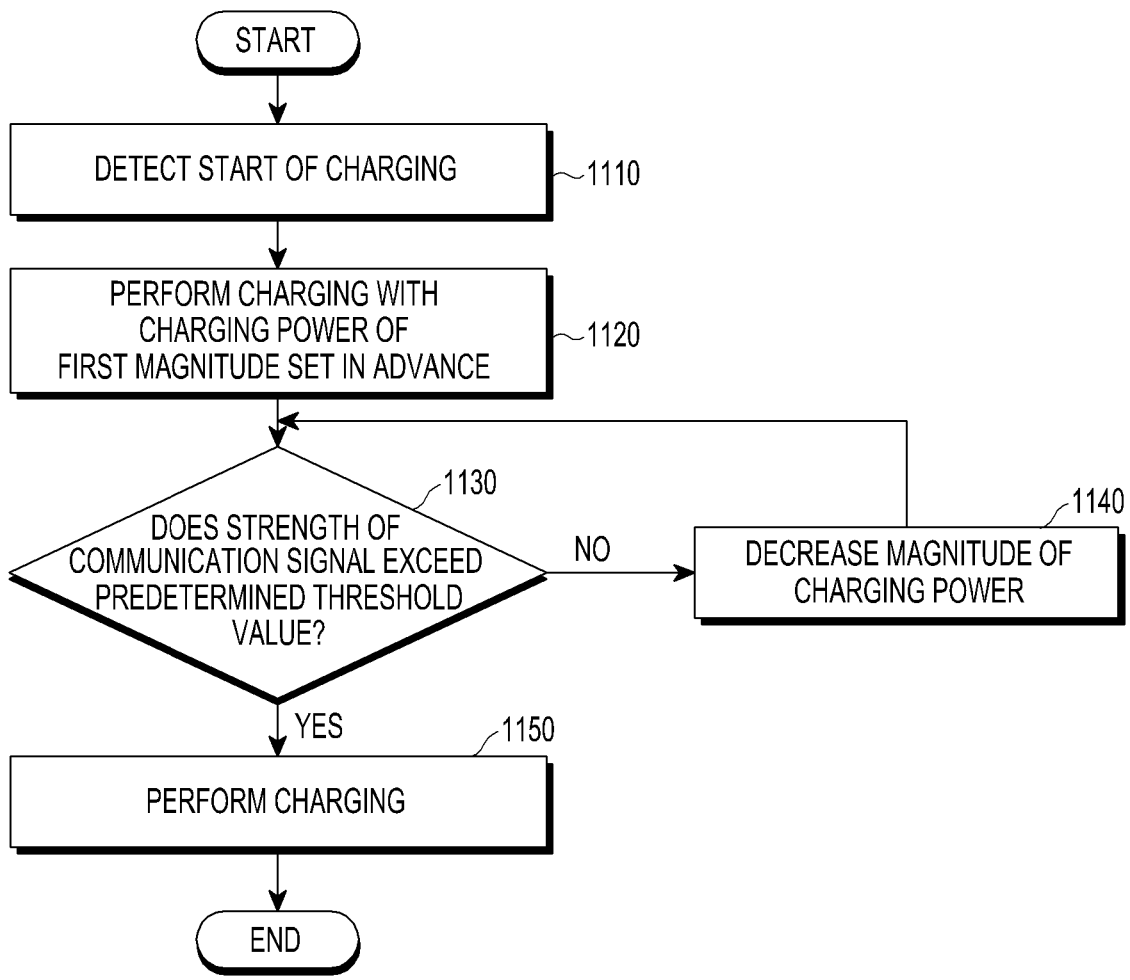
FIG. 11 is a flowchart illustrating an example operation method of an electronic device according to various example embodiments of the present disclosure.
Figure 12:
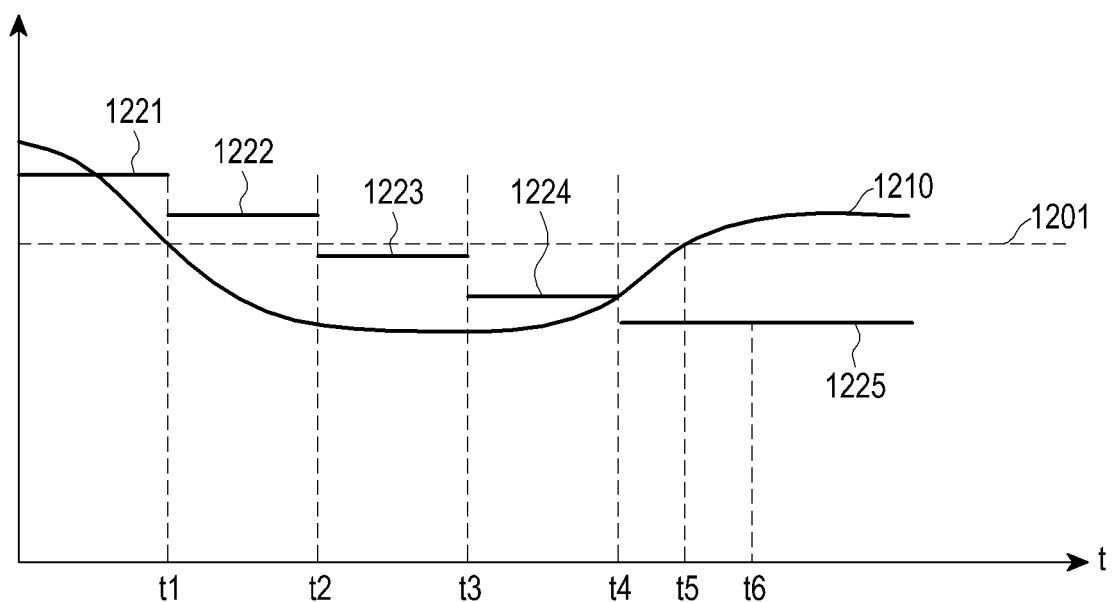
FIG. 12 is a graph illustrating the strength of a communication signal and the magnitude of charging power according to various example embodiments of the present disclosure.

FIG. 11 is a flowchart illustrating an example operation method of an electronic device according to various example embodiments of the present disclosure. The embodiment of FIG. 11 will be described in greater detail with reference to FIG. 12. FIG. 12 is a graph illustrating example strength of a communication signal and the magnitude of charging power according to various example embodiments of the present disclosure.

In operation 1110, the electronic device 101 detects the start of charging, such as the insertion of a wired charging terminal, the initiation of wireless charging, or the like. In the case of wireless charging, the electronic device 101 may detect the start of wireless charging, such as the reception of a charging start signal, the generation of induced electromotive force in a coil, or the like. In operation 1120, the electronic device 101 performs charging with charging power of a first magnitude, which is set in advance. For example, as illustrated in FIG. 12, the electronic device 101 may perform charging with power 1221 of a first magnitude.

In the embodiment of FIG. 12, the electronic device 101 may perform charging with power of various magnitudes, in addition to two charging modes. For example, as illustrated in FIG. 12, the electronic device 101 may perform charging with power 1221 of the first magnitude to power 1225 of a fifth magnitude. As described above, the electronic device 101 may perform at least one out of adjusting an input current of a charger and transmitting a communication signal for adjusting an output voltage of an adapter, whereby the magnitude of charging power may be adjusted. Alternatively, in the case of wireless charging, the electronic device 101 may perform at least one out of adjusting an input current of a charger, detuning a resonant frequency, and transmitting a communication signal for adjusting output power of a wireless power transmitter, whereby the magnitude of charging power may be adjusted. Particularly, a USB-C type is configured to provide a broad range of power, whereby the electronic device 101 may receive power of various magnitudes.

In operation 1130, the electronic device 101 may determine whether the strength of a communication signal 1210 exceeds a predetermined threshold value 1201. When the strength of the communication signal 1210 exceeds the predetermined threshold value 1201, the electronic device may perform charging with power of a current magnitude in operation 1150. When the strength of the communication signal 1210 is less than or equal to the predetermined threshold value 1201, the electronic device 101 may decrease the magnitude of charging power in operation 1140. For example, the electronic device 101 may perform charging with power 1222 of a second magnitude. The electronic device 101 may measure the strength of the communication signal 1210 again at a second point in time (t2), and may determine that the strength of the communication signal 1210 is still less than or equal to the threshold value 1201. The electronic device 101 may decrease the magnitude of power to power 1223 of a third magnitude. The electronic device 101 may measure the strength of the communication signal 1210 at a third point in time (t3) and a fourth point in time (t4), and may decrease the magnitude of charging power during this period to power 1224 of a fourth magnitude. At a fifth point in time (t5), the electronic device 101 may determine that the strength of the communication signal 1210 exceeds the threshold value 1201. The electronic device 101 may maintain charging with corresponding power 1225 based on the fact that the strength of the communication signal 1210 exceeds the threshold value 1201. Accordingly, at a sixth point in time (t6), the electronic device 101 may maintain the reception of the corresponding power 1225, without changing the magnitude of power.

According to various embodiments of the present disclosure, when it is determined that the strength of the communication signal 1210 increases, the electronic device 101 may immediately maintain the magnitude of charging power. For example, in the embodiment of FIG. 12, the strength of the communication signal 1210 may increase during the interval between t3 to t4. When it is determined that the strength of the communication signal 1210 increases, the electronic device 101 may maintain or increase the magnitude of charging power.

Figure 13:
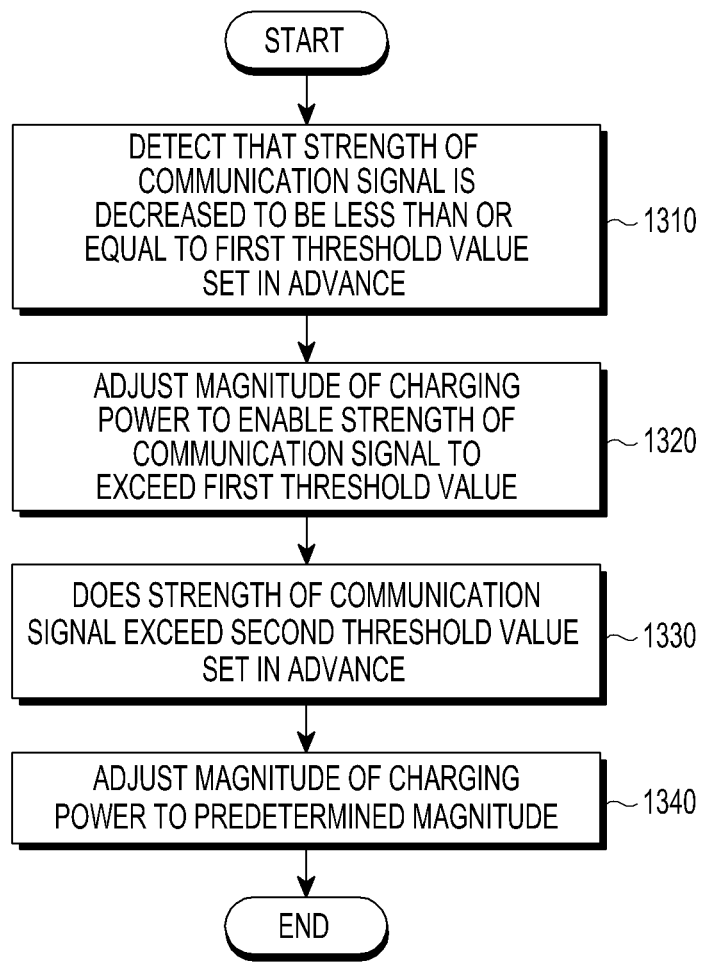
FIG. 13 is a flowchart illustrating an example operation method of an electronic device according to various example embodiments of the present disclosure.
Figure 14:
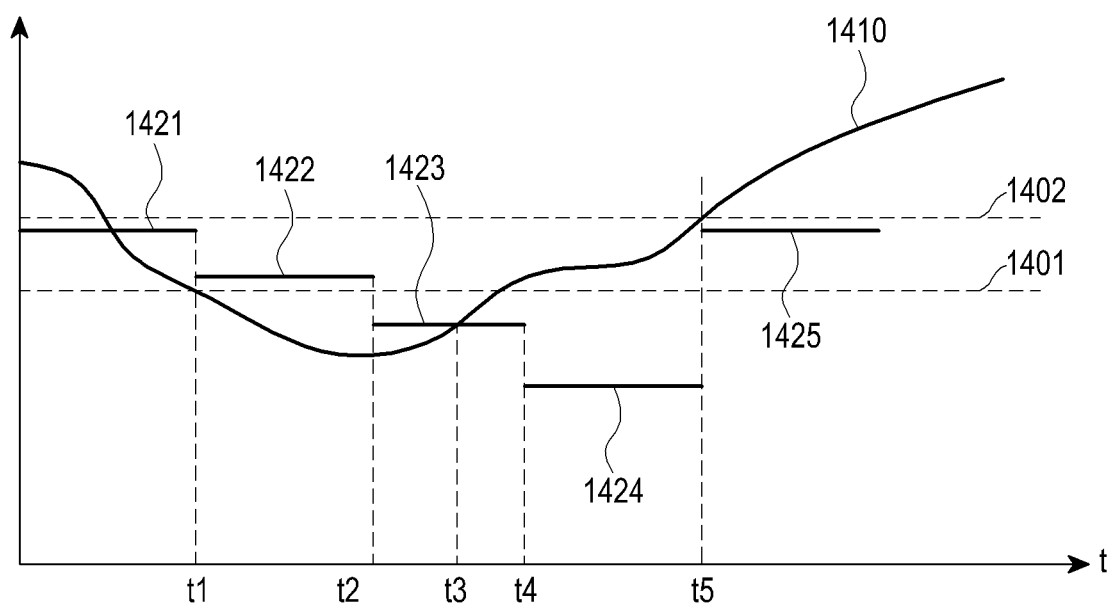
FIG. 14 is a graph illustrating the strength of a communication signal and the magnitude of charging power according to various example embodiments of the present disclosure.

FIG. 13 is a flowchart illustrating an example operation method of an electronic device according to various example embodiments of the present disclosure. The embodiment of FIG. 13 will be described in greater detail with reference to FIG. 14. FIG. 14 is a graph illustrating example strength of a communication signal and the magnitude of charging power according to various example embodiments of the present disclosure.

In operation 1310, the electronic device 101 may detect that the strength of a communication signal decreases to be less than or equal to a first threshold value. For example, as illustrated in FIG. 14, the electronic device 101 may perform charging with power 1421 of a first magnitude. At a first point in time (t1), the electronic device 101 may detect that the strength of a communication signal 1410 decreases to be less than or equal to a first threshold value 1401. In operation 1320, the electronic device 101 may adjust the magnitude of charging power such that the strength of the communication signal exceeds the first threshold value 1401. For example, the electronic device 101 may gradually decrease the magnitude of charging power, whereby charging is performed with power 1422 of a second magnitude.

In operation 1330, the electronic device 101 may determine whether the strength of the communication signal 1410 exceeds a second threshold value 1402 set in advance. For example, as illustrated in FIG. 14, the electronic device 101 may decrease the magnitude of power to power 1423 of a third magnitude and power 1424 of a fourth magnitude. In operation 1340, the electronic device 101 may adjust the magnitude of charging power to a predetermined magnitude. For example, as illustrated in FIG. 14, the electronic device 101 may perform charging with power 1425 of a first magnitude. The second threshold value 1402 may be a numeric value which is set to provide good communication service even in the quick charging mode. According to various embodiments, the second threshold value 1402 may be set to be higher than the first threshold value 1401. Accordingly, the electronic device 101 may be prevented from being repeatedly switched between the normal charging mode and the quick charging mode.

According to various embodiments of the present disclosure, when it is determined that the strength of the communication signal 1410 increases, the electronic device 101 may immediately maintain the magnitude of charging power. For example, in the embodiment of FIG. 14, the strength of the communication signal 1410 may increase during the interval between t1 to t2. When it is determined that the strength of the communication signal 1410 increases, the electronic device 101 may increase the magnitude of charging power.

Figure 15:
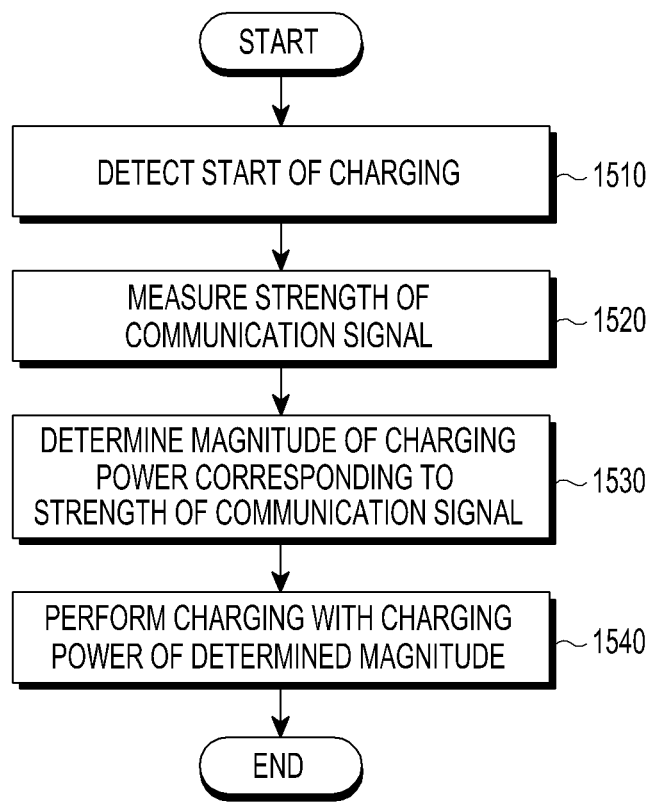
FIG. 15 is a flowchart illustrating an example operation method of an electronic device according to various example embodiments of the present disclosure.

FIG. 15 is a flowchart illustrating an example operation method of an electronic device according to various example embodiments of the present disclosure.

In operation 1510, the electronic device 101 detects the start of charging, such as the insertion of a wired charging terminal, the initiation of wireless charging, or the like. In the case of wireless charging, the electronic device 101 may detect the start of wireless charging, such as the reception of a charging start signal, the generation of induced electromotive force in a coil, or the like. In operation 1520, the electronic device 101 may measure the strength of a communication signal. In operation 1530, the electronic device 101 may determine the magnitude of charging power corresponding to the strength of the communication signal. The electronic device 101 may store, in advance, association information between the strength of a communication signal and the magnitude of charging power. The electronic device 101, for example, may store association information as shown in Table 1, in advance.

TABLE 1

| Strength of received communication signal (RSRP) (dB) | Magnitude of charging power (W) |
|---|---|
| exceed −85 | first magnitude |
| exceed −95 and less than or equal to −85 | second magnitude |
| exceed −105 and less than or equal to −95 | third magnitude |
| exceed −115 and less than or equal to −105 | fourth magnitude |
| less than or equal to −115 | 0 (interrupt charging) |

The electronic device 101 may determine the magnitude of charging power with reference to association information of Table 1. For example, when the electronic device 101 determines that the RSRP of a communication signal is −100 DB, the electronic device 101 may determine the magnitude of charging power as a third magnitude, and may perform charging with power of the determined magnitude. For example, an adapter may be configured to provide power of 15 W with a voltage of 9V and a current of 1.67 A for quick charging. In this instance, it is assumed that the adapter is incapable of adjusting an output voltage. The electronic device 101 may determine the magnitude of an input current of a charger by dividing the determined magnitude of power by the magnitude of the output voltage of the adapter. In this instance, the electronic device 101 may determine the magnitude of the input current of the charger by dividing a third magnitude, which is the determined magnitude of power, by 9V, which is the output voltage of the adapter. The electronic device 101 may be configured to stop charging when the RSRP of a communication signal is less than or equal to −115 dB, which is relatively low.

In operation 1540, the electronic device 101 may control charging to be performed with charging power of the determined magnitude. The electronic device 101 may control the magnitude of the input current of the charger to 1 A, whereby the electronic device 101 controls charging to be performed with charging power of 9 W.

When the adapter is capable of adjusting an output voltage, the electronic device 101 may output, to the adapter, a communication signal that requests changing the output voltage of the adapter, thereby controlling charging to be performed with power of the determined magnitude. According to various embodiments of the present disclosure, the electronic device 101 may store association information between the strength of a communication signal and an input current of the charger, instead of association information between the strength of a communication signal and the magnitude of charging power as shown in Table 1. The electronic device 101 may adjust the magnitude of the input current of the charger with reference to association information, without separate calculation. According to another embodiment, the electronic device 101 may store association information between the strength of a communication signal and an output voltage of the adapter. The electronic device 101 may determine an output voltage of the adapter with reference to association information without separate calculation, and may transmit, to the adapter, a communication signal that requests controlling based on the determined output voltage. According to another embodiment, the electronic device 101 may store association information between the strength of a communication signal and the degree of detuning of a resonant frequency. The electronic device 101 may adjust the magnitude of charging power through detuning, with reference to association information.

According to another embodiment, the electronic device 101 may store association information between the strength of a communication signal and the magnitude of a resonator-applied-power of a wireless power transmitter. The electronic device 101 may transmit, to the wireless power transmitter, a communication signal that requests adjustment based on the magnitude of a resonator-applied power corresponding to a communication signal with reference to association information.

Figure 16A:
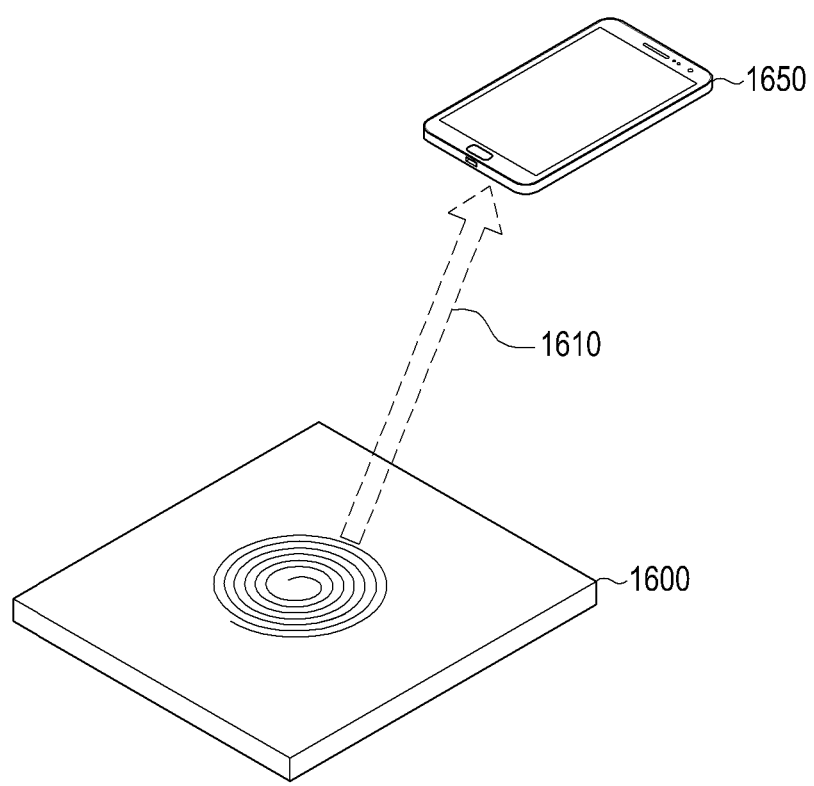
FIG. 16A is a diagram illustrating an example of wireless charging according to various example embodiments of the present disclosure.
Figure 16B:
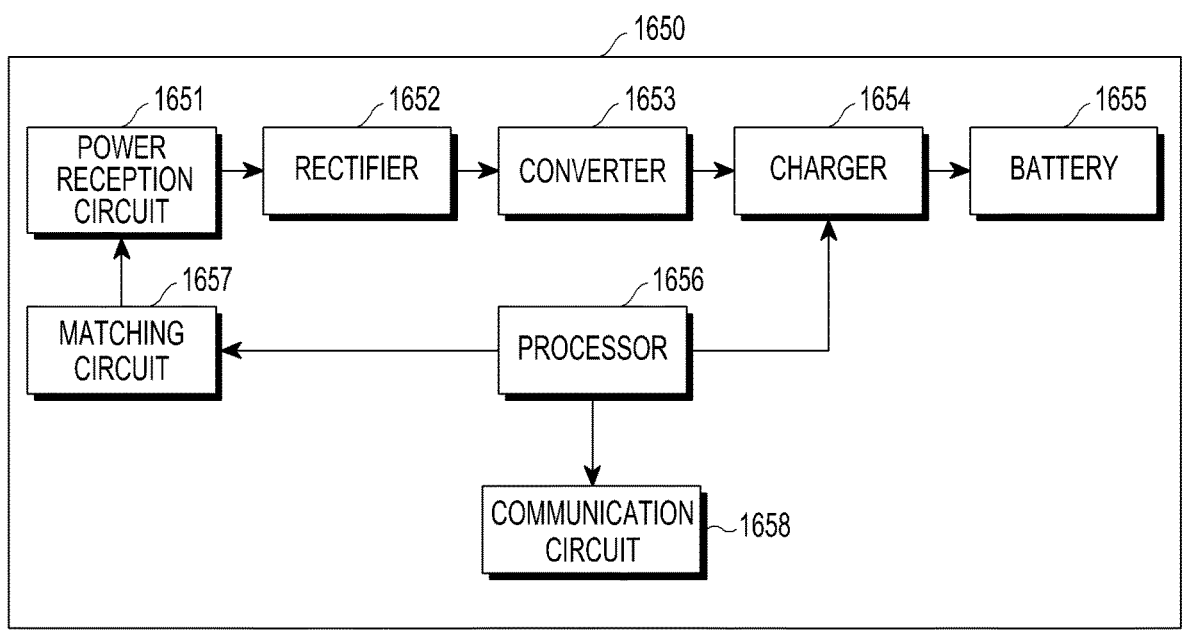
FIG. 16B is a block diagram illustrating an example electronic device that is capable of receiving wireless power according to various example embodiments of the present disclosure.

FIG. 16A is a diagram illustrating an example of wireless charging according to various example embodiments of the present disclosure. FIG. 16B is a block diagram illustrating an example electronic device that is capable of receiving wireless power according to various example embodiments of the present disclosure.

An electronic device 1650 may receive power 1610 wirelessly from a wireless power transmitter 1600, as illustrated in FIG. 16A. Referring to FIG. 16B, the electronic device 1650 may include a power reception circuit 1651, a rectifier 1652, a converter 1653, a charger 1654, a battery 1655, a processor (e.g., including processing circuitry) 1656, a matching circuit 1657, and a communication circuit 1658.

The power reception circuit 1651 may receive power wirelessly from the wireless power transmitter. The power reception circuit 1651, for example, may include a coil according to an inductive scheme, and may form an induced electromotive force based on a magnetic field formed around the coil. Alternatively, the power reception circuit 1651, for example, may include a resonant circuit according to a resonant scheme, and may generate power by receiving an electromagnetic field formed around the resonant circuit. The power reception circuit 1651, for example, may include an array antenna so as to receive a radio frequency (RF) transmitted from an array antenna according to an RF scheme. The power reception circuit 1651 may output received AC-waveform power to the rectifier 1652. The rectifier 1652 may rectify the received AC-waveform power to a DC-waveform, and output the same to the converter 1653. The converter 1653 may down-convert the received DC power and output the same to the charger 1654.

The charger 1654 may process received input power to be appropriate for charging the battery 1655, and may provide the same to the battery 1655. The processor 1656 may adjust the magnitude of charging power based on the strength of a received communication signal. The processor 1656 may adjust the magnitude of charging power by adjusting an input current of the charger 1654 based on the strength of a received communication signal.

The matching circuit 1657 may include at least one of a coil and a capacitor for impedance matching with the wireless power transmitter. The processor 1656 may determine to decrease the magnitude of charging power based on the fact that the strength of a communication signal is less than or equal to a threshold value. The processor 1656 may detune a resonant frequency by connecting at least one of a capacitor and a coil to a resonator, when the power reception circuit 1651 includes the resonator. As the resonant frequency is detuned, the magnitude of power received by the power reception circuit 1651 may be decreased. Accordingly, the processor 1656 may decrease the magnitude of power by detuning a resonant frequency. That is, the processor 1656 may change the magnitude of received power by changing a reception condition of the power reception circuit 1651.

Alternatively, the processor 1656 may perform control to transmit a communication signal that requests decreasing charging power to the wireless power transmitter through the communication circuit 1658. The communication circuit 1658, for example, may be for short-range communication. In this instance, the processor 1656 may adjust the magnitude of charging power based on the strength of a communication signal received from another communication circuit for telephone or data communication.

Figure 17:
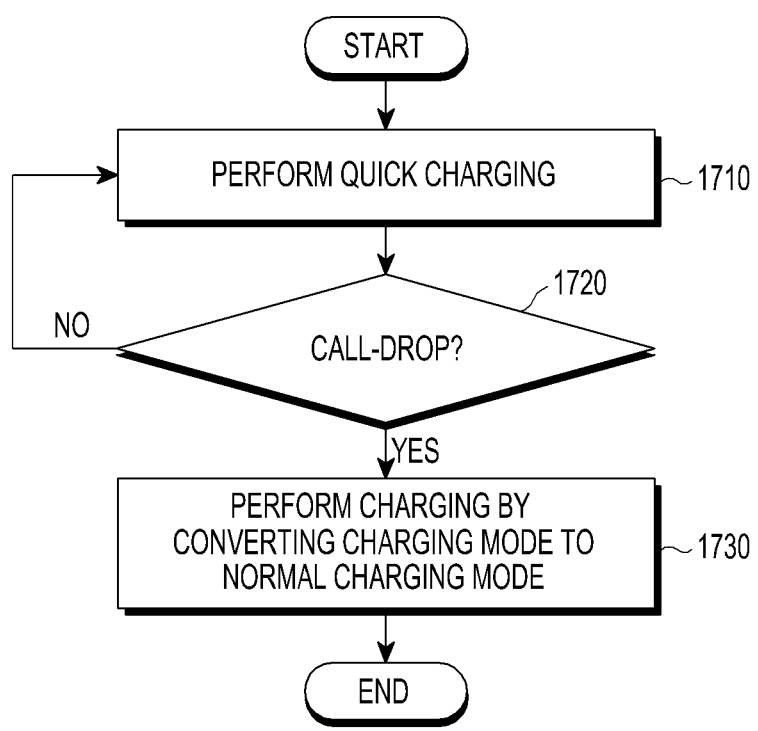
FIG. 17 is a flowchart illustrating an example operation method of an electronic device according to various example embodiments of the present disclosure.

FIG. 17 is a flowchart illustrating an example operation method of an electronic device according to various example embodiments of the present disclosure.

In operation 1710, the electronic device 101 may perform quick charging. In operation 1720, the electronic device 101 may determine whether call-drop occurs. For example, call-drop may occur due to RF noise attributable to quick charging. In operation 1730, the electronic device 101 may perform charging by converting a charging mode to the normal charging mode if a call-drop occurs.

Figure 18:
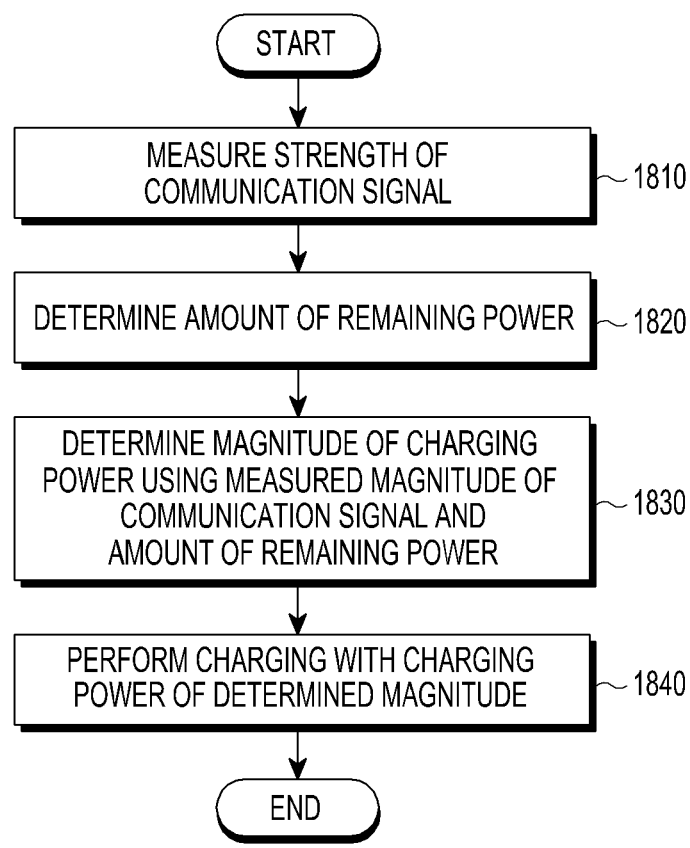
FIG. 18 is a flowchart illustrating an example operation method of an electronic device according to various example embodiments of the present disclosure.

FIG. 18 is a flowchart illustrating an example operation method of an electronic device according to various example embodiments of the present disclosure.

In operation 1810, the electronic device 101 may measure the strength of a communication signal. In operation 1820, the electronic device 101 may determine the amount of remaining battery power. In operation 1830, the electronic device 101 may determine the magnitude of charging power based on the measured strength of the communication signal and the amount of remaining battery power. For example, when the amount of remaining battery power is less than or equal to a predetermined threshold value, the electronic device 101 may perform charging with power of a magnitude for quick charging even when the provision of good communication service is not secured. When the amount of remaining battery power of the electronic device 101 exceeds a predetermined threshold value, the electronic device 101 may be configured to perform charging with relatively low power so as to provide a good communication service. In operation 1840, the electronic device 101 may perform charging with power of the determined magnitude.

An operation method for charging a battery by an electronic device according to various example embodiments may include: obtaining the strength of a communication signal received by the electronic device; determining a magnitude of power for charging the battery based on the strength of the communication signal; and performing control to charge the battery with power of the determined magnitude.

Determining the magnitude of power according to various example embodiments of the present disclosure may include: determining the magnitude of power to be a first magnitude for normal charging when the strength of the communication signal is less than or equal to a first threshold value; and determining the magnitude of power to be a second magnitude for quick charging when the strength of the communication signal exceeds the first threshold value.

Determining the magnitude of power according to various example embodiments of the present disclosure may further include: determining that the strength of the communication signal is increased beyond a second threshold value, in the middle of charging with power of the first magnitude since it was determined that the strength of the communication signal was less than or equal to a first threshold value; and changing the magnitude of power from the first magnitude to the second magnitude.

Determining the magnitude of power according to various example embodiments of the present disclosure may include: comparing the strength of the communication signal with a first threshold value; gradually decreasing the magnitude of power until the strength of the communication signal exceeds the first threshold value when the strength of the communication signal is less than or equal to the first threshold value; and maintaining charging with power of the decreased magnitude. It may be determined whether the strength of the communication signal is increased to a level greater than a second threshold value during charging with power of the first magnitude after determining that the strength of the communication signal is less than or equal to the first threshold value; and change the magnitude of power from the first magnitude to the second magnitude based on determining that the strength of the communication signal is increased beyond the second threshold value.

Determining the magnitude of power according to various example embodiments of the present disclosure may include: determining that the magnitude of the communication signal is increased beyond a second threshold value, while charging is maintained with power of the decreased magnitude; and increasing the magnitude of power to a predetermined magnitude.

Determining the magnitude of power according to various example embodiments of the present disclosure may further include: reading association information between a plurality of strengths of communication signals received by the electronic device and information associated with a plurality of magnitudes of power for charging, which respectively correspond to each of the plurality of strengths; and determining the magnitude of power by comparing the strength of the communication signal and the association information.

The operation method of the electronic device according to various example embodiments of the present disclosure may further include controlling an input current of a charger of the electronic device based on the magnitude of power.

An operation method of an electronic device according to various example embodiments of the present disclosure may further include: determining an output voltage of an adapter that provides power to the electronic device, based on the magnitude of power; and transmitting, to the adapter, another communication signal that requests adjustment of the output voltage of the adapter.

The term "module" used in the present disclosure may refer to, for example, a unit including one or more combinations of hardware, software, and firmware. The "module" may be interchangeable with a term, such as a unit, a logic, a logical block, a component, or a circuit. The "module" may be the smallest unit of an integrated component or a part thereof. The "module" may be a minimum unit for performing one or more functions or a part thereof. The "module" may be mechanically or electronically implemented. For example, the "module" according to the present disclosure may include, for example, and without limitation, at least one of a dedicated processor, a CPU, an Application-Specific Integrated Circuit (ASIC) chip, a Field-Programmable Gate Arrays (FPGA), and a programmable-logic device for performing operations which has been known or are to be developed hereinafter.

According to various example embodiments, at least some of the devices (for example, modules or functions thereof) or the method (for example, operations) according to the present disclosure may be implemented by a command stored in a computer-readable storage medium in a programming module form. When the command is executed by one or more processors (for example, the processor 120), the one or more processors may execute a function corresponding to the command. The computer-readable storage medium may, for example, be the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added.

According to various example embodiments of the present disclosure, a storage medium that stores instructions is provided, wherein the instructions are configured to enable at least one processor to perform at least one operation when the instructions are executed by at least one processor, the at least one operation including: obtaining the strength of a communication signal received by the electronic device; determining the magnitude of power for charging the battery based on the strength of the communication signal; and performing control to charge the battery with power of the determined magnitude.

The various example embodiments disclosed herein are provided to aid in describing technical details of the present disclosure and to aid in the understanding of the present disclosure, and are not intended to limit the scope of the present disclosure. Therefore, it should be understood that various modifications and changes or modified and changed forms based on the technical idea of the present disclosure fall within the scope of the present disclosure as defined in the appended claims and their equivalents.

What is claimed is:

1. An electronic device, comprising:
   a power receiving circuit configured to receive power from an external power source by a wired connection with the external power source;
   a communication circuit;
   a battery; and
   a processor,
   wherein the processor is configured to perform control to:
   obtain, using the communication circuit, a strength of a communication signal received from an external device while charging the battery by the wired connection;
   determine a magnitude of power for charging the battery by the wired connection, based on the strength of the communication signal; and
   charge, using the power received by the wired connection from the external power source with the power receiving circuit, the battery with the power of the determined magnitude,
   wherein the communication signal includes a cellular communication signal,
   wherein the external device is not the external power source.

2. The electronic device of claim 1, wherein the processor is configured to:

determine the magnitude of power to be a first magnitude for normal charging when the strength of the cellular communication signal is less than or equal to a first threshold value; and determine the magnitude of power to be a second magnitude for quick charging when the strength of the cellular communication signal exceeds the first threshold value.

3. The electronic device of claim 2, wherein the processor is configured to:

determine whether the strength of the cellular communication signal is increased to a level greater than a second threshold value during charging with power of the first magnitude after determining that the strength of the cellular communication signal is less than or equal to the first threshold value; and change the magnitude of power from the first magnitude to the second magnitude based on determining that the strength of the cellular communication signal is increased beyond the second threshold value.

4. The electronic device of claim 1, wherein the processor is configured to:

compare the strength of the cellular communication signal with a first threshold value;

gradually decrease the magnitude of power when the strength of the cellular communication signal is less than or equal to the first threshold value until the strength of the cellular communication signal exceeds the first threshold value; and maintain charging with power of the decreased magnitude.

5. The electronic device of claim 4, wherein the processor is configured to:

determine whether the magnitude of the cellular communication signal is increased to be greater than a second threshold value while charging is maintained with power of the decreased magnitude; and increase the magnitude of power to a predetermined magnitude when it is determined that the magnitude of the cellular communication signal is increased to be greater than the second threshold value.

6. The electronic device of claim 1, wherein the processor is configured to:

read association information between a plurality of strengths of communication signals received by the electronic device and information associated with a plurality of magnitudes of power for charging, which respectively correspond to each of the plurality of strengths; and determine the magnitude of power by comparing the strength of the cellular communication signal with the association information.

7. The electronic device of claim 1, wherein the power receiving circuit comprises a charger configured to process power and charge the battery.

8. The electronic device of claim 7, wherein the processor is configured to control an input current of the charger based on the magnitude of power.

9. The electronic device of claim 7, wherein the charger receives power from the external power source via an adapter through at least one of: a USB-micro B type or USB-C type power line.

10. The electronic device of claim 9, wherein the processor is configured to:

determine an output voltage of the adapter based on the magnitude of power; and transmit, to the adapter through the USB-micro B type or USB-C type data line, a communication signal that requests adjusting the output voltage of the adapter.

11. The electronic device of claim 1, wherein the power receiving circuit is configured to receive wireless power from a wireless power transmitter, wherein the processor is configured to control a reception condition of the power receiving circuit based on the magnitude of power.

12. The electronic device of claim 1, wherein the power receiving circuit is configured to receive wireless power from a wireless power transmitter, wherein the processor is configured to transmit a communication signal that requests adjusting the wireless power based on the magnitude of power to the wireless power transmitter through another communication circuit.

13. The electronic device of claim 1, wherein the processor is configured to:

determine an amount of remaining power of the battery; and determine the magnitude of power based on the strength of the cellular communication signal and the amount of remaining power.

14. An operation method for charging a battery included in an electronic device comprising a power receiving circuit configured to receive power from an external power source by a wired connection with the external power source, the method comprising:

obtaining, using a communication circuit of the electronic device, a strength of a cellular communication signal received from an external device while charging the battery by the wired connection;

determining a magnitude of power for charging the battery by the wired connection, based on the strength of the cellular communication signal; and charging, using the power received by the wired connection from the external power source with the power receiving circuit of the electronic device, the battery with power of the determined magnitude, wherein the communication signal includes a cellular communication signal, wherein the external device is not the external power source.

15. The method of claim 14, wherein the determining the magnitude of power comprises:

determining the magnitude of power to be a first magnitude for normal charging when the strength of the cellular communication signal is less than or equal to a first threshold value; and determining the magnitude of power to be a second magnitude for quick charging when the strength of the cellular communication signal exceeds the first threshold value.

16. The method of claim 15, wherein the determining the magnitude of power further comprises:

determining whether the strength of the cellular communication signal is increased to be greater than a second threshold value, while charging is performed with power of the first magnitude based on the determination that the strength of the cellular communication signal is less than or equal to a first threshold value; and changing the magnitude of power from the first magnitude to the second magnitude when the strength of the cellular communication signal is determined to be increased to be greater than the second threshold value.

17. The method of claim 14, wherein the determining the magnitude of power comprises:

comparing the strength of the cellular communication signal with a first threshold value;

gradually decreasing the magnitude of power when the strength of the cellular communication signal is less than or equal to the first threshold value until the strength of the cellular communication signal exceeds the first threshold value; and maintaining charging with power of the decreased magnitude.

18. The method of claim 17, wherein the determining the magnitude of power comprises:

determining whether the magnitude of the cellular communication signal is increased to be greater than a second threshold value, while charging is maintained with power of the decreased magnitude; and increasing the magnitude of power to a predetermined magnitude when the magnitude of the cellular communication signal is increased to be greater than the second threshold value.

19. The method of claim 14, wherein the determining the magnitude of power comprises:

reading association information between a plurality of strengths of communication signals received by the electronic device and information associated with a plurality of magnitudes of power for charging, which respectively correspond to each of the plurality of strengths; and determining the magnitude of power by comparing the strength of the cellular communication signal and the association information.

20. The method of claim 14, further comprising:

controlling an input current of a charger of the electronic device based on the magnitude of power.

* * * * *